United States Patent
Terada

[11] Patent Number: 5,305,045
[45] Date of Patent: Apr. 19, 1994

[54] CAMERA HAVING TILTABLE FOCUSING LENS, POSITIONAL/DEPTH DISPLAY AND COOPERATING FLASH ASSEMBLY

[75] Inventor: Hiroshi Terada, Mitaka, Japan
[73] Assignee: Olympus Optical Co., Ltd., Tokyo, Japan
[21] Appl. No.: 932,871
[22] Filed: Aug. 20, 1992
[30] Foreign Application Priority Data Aug. 22, 1991 [JP] Japan .................................. 3-211041
Dec. 27, 1991 [JP] Japan .................................. 3-346596

[51] Int. Cl.$^5$ ...................... G03B 13/36; G03B 15/03; G03B 17/20
[52] U.S. Cl. .................................. 354/400; 354/403; 354/409; 354/413; 354/132; 354/289.12
[58] Field of Search ............... 354/400, 402, 403, 132, 354/413, 416, 417, 421, 409, 410, 412, 289.1, 289.12

[56] References Cited

U.S. PATENT DOCUMENTS 4,943,824  7/1990  Nabeshima et al. ................. 354/403

FOREIGN PATENT DOCUMENTS 28416  8/1984  Japan .
19021  5/1986  Japan .
62-52538  3/1987  Japan .
225337  8/1992  Japan .
233528  8/1992  Japan .

Primary Examiner—W. B. Perkey
Attorney, Agent, or Firm—Louis Weinstein

[57] ABSTRACT

The present invention comprises a distance measuring unit for measuring distances to subjects existent in specific areas within a photographic angle of view, a memory for storing distance measurement information representing measured distances from the camera to at least two subjects existent at different distances the distance measuring unit provides, a specifying unit for specifying positional relationships of at least two subjects to the camera, a display interlocked with specification of the specifying unit and helping an user recognize the positional relationships the specifying unit provides, an arithmetic logic unit for computing the distance measurement information and positional relationships to calculate an inclination of a photographic optical system necessary for producing an image in which at least two subjects are in focus, and a drive for tilting the photographic optical system according to an output of the arithmetic logic unit. Alternatively, this invention comprises an arithmetic logic unit for computing the distance measurement information and positional relationships to calculate angles of the subjects relative to the center axis of the camera, and at least two flashtubes for varying quantities of flashlight according to the information the arithmetic logic unit provides, and thus exposing the subjects to light optimally.

71 Claims, 43 Drawing Sheets

CAMERA HAVING TILTABLE FOCUSING LENS, POSITIONAL/DEPTH DISPLAY AND COOPERATING FLASH ASSEMBLY

BACKGROUND OF THE INVENTION

1. Field of the Invention

The present invention relates to a camera having a built-in tilt mechanism for bringing at least two subjects into focus and a camera having a built-in flashing device capable of distributing light to the two subjects optimally.

2. Description of the Related Art

When multiple main subjects are present within a photographic angle of field, two methods have been adopted to take photographs in which at least two subjects existent at different distances from a camera are in focus.

The first method has been disclosed in Japanese Patent Laid-Open No. 62-52538, wherein an f-number is optimized and thus a focus is adjusted to provide a subject field depth that is deep enough to include multiple subjects. The second method is based on a law of shine-proof (to be described later). According to the law of shine-proof, when a photographic optical system is tilted to incline subjects to be imaged with respect to a film surface, multiple subjects at different distances will come into focus. This method is popular among, for example, skilled people who use an exchange lens in combination with a 35-mm single-lens reflex camera having a tilt mechanism.

Various methods based on the law of shine-proof have been proposed to enable tilt photography not using any sophisticated technology. For instance, in Japanese Patent Laid-Open No. 2-79808 the present applicant has proposed and Japanese Patent Laid-Open No. 2-55212 have disclosed tilt photography using a multi-point distance measuring mechanism that measures distances to subjects in multiple distance measurement domains to calculate a quantity of tilt, then tilts the photographic optical system according to the calculated quantity of tilt. Then, these methods imply that tilt photography can easily be implemented in lens-shutter type cameras.

However, the first method, which is dependent on a subject field depth has a problem that usable situations are limited because a subject field depth becomes insufficient depending on brightness of a subject or a difference between distances to subjects. The first method has proved effective only on limited occasions.

The second method using the tilt mechanism has an intended advantage. However, the existing multi-point distance measuring mechanism automatically measures distances to multiple main subjects 154 and 155 existent in multiple predetermined distance measurement areas 151, 152, and 153 within a photographic screen when release is done. The multiple main subjects 154 and 155 are not always positioned in the distance measurement areas 151, 152, and 153 (See FIG. 78). Therefore, only when multiple subjects are positioned in the distance measurement areas, an image in which all the subjects are in focus cannot be produced. Therefore, the method is usable on strictly restricted occasions. Consequently, a lens-shutter type automatic focusing camera having a tilt mechanism has not made its debut.

On the other hand, when a subject illuminance is lower than a certain level, a strobe has been employed in the past. Strobe lighting from a camera to subjects is designed to be uniform within a photographic angle of view. The lighting characteristic of a conventional strobe will be described below.

FIG. 83 plots the lighting characteristic in the longitudinal direction of a screen of a strobe conventionally employed. Herein, the x axis represents right and left angles with respect to the optical axis of a photographic lens, and the y axis represents a quantity of flashlight the strobe produces. The lighting characteristic of FIG. 83 applies to a normal full-size film camera having a photographic lens with a focal distance of 35 mm, which is uniform at about 27° or less on each side of an angle of view.

In actual strobe photography, no problem occurs when subjects 161 to 163 reside at the same distance h1 from a camera 160 as shown in FIG. 84. When main subjects 164 to 166 reside at different distances h1, h2, and h3 within an angle of view, since a strobe lighting pattern is uniform within a photographic angle of view, only one point among subjects can be exposed to light correctly.

When a condition closest to a natural scene must be created, multiple strobes have been used to radiate flashes or bounce photography has been carried out.

Alternatively, a means for using a single strobe and changing lighting in an angle of view according to a type of subject has been disclosed in Japanese Examined Utility Model Publication No. 59-28416 or Japanese Examined Patent Publication No. 61-19021. In these means, a liquid crystal plate capable of influencing part of a strobe light transmission range is placed in the front of a flashing unit having a uniform pattern. Then, when release is done, before main flashing is executed, infrared light is projected to the screen to check if a subject resides nearby. If a subject is present, the liquid crystal plate is driven to attenuate the strobe light in the area corresponding to the subject, and thus lighting is varied.

When multiple strobes are employed or the foregoing means enabling bounce photography is used, a large-sized and sophisticated strobe results. In addition, a photographer must find an optimal setting for all subjects, and, therefore, needs advanced skill. Therefore, only skilled people can enjoy photography using cameras having such strobes, but ordinary users find it very difficult to use the cameras.

A means for varying lighting using a liquid crystal member placed in the front of a flashing unit has been disclosed in Japanese Examined Utility Model Publication No. 59-28416. Using this means, a liquid crystal member and a liquid crystal control having no direct relation to a strobe must be installed in a camera. Furthermore, the means shields effective rays using liquid crystals to provide various lighting characteristics, which, therefore, is subject to a large loss due to diffusion and heat dissipation. Even if an intended lighting characteristic is yielded, a quantity of flashlight from the strobe diminishes greatly.

Moreover, the flashing unit is not a point light source. Even if the front of the flashing unit is partly shielded, overall lighting is hardly reduced. Thus, a variable range of a lighting pattern is strictly limited.

Then, the present applicant has submitted Japanese Patent Application No. 2-409240 and proposed a double-flash type "variable lighting strobe" characterized by two flashing units having heteromorphic lighting patterns that are symmetric with respect to the photographic optical axis. Then, the flashing units are controlled in such a way that their quantities of light are varied to provide various lighting patterns.

Proposed in Japanese Patent Application No. 2-408198 is a strobe in which lighting control for the variable lighting strobe is automated depending on multi-point automatic focusing (hereafter, AF) information.

Lighting variation proposed in Japanese Patent Application No. 2-409240 is achieved manually. This has proved helpful for experienced people because it allows them to take photographs as they imagine, but has been difficult for newcomers to use.

A means using a technology based on multi-point AF and proposed in the Japanese Patent Application No. 2-408198 is friendly to newcomers. However, when three-point AF is employed, if main subjects are away from a distance measurement position, intended results are unavailable. That is to say, as shown in FIG. 77, when subjects 154 and 155 agree with second and third distance measurement frames 152 and 153, no problem occurs. However, when photography is attempted in a photographic scene in which the subjects 154 and 155 disagree with the distance measurement frames 152 and 153, distance measurement is disabled.

OBJECTS AND SUMMARY OF THE INVENTION

The first object of the present invention is to provide a camera adopting automatic focusing and having a built-in tilt mechanism capable of following various subjects at different distances.

The second object of the present invention is to provide a camera having only a single-point distance measurement mechanism and providing an optimal lighting characteristic for each of two subjects at different subject distances.

To be brief, the present invention comprises a distance measuring means for measuring distances to subjects existent in specific areas within a photographic angle of view, a storing means for storing distance measurement information representing measured distances from a camera to at least two subjects existent at different distances, a specifying means for specifying positional relationships of at least two subjects to the camera, a displaying means interlocked with the specifying means and helping a user recognize the positional relationships the specifying means provides, an arithmetic logic means for computing the distance measurement information and the positional relationships and calculating an inclination of a photographic optical system necessary to produce an image in which at least two subjects are in focus, and a driving means for tilting the photographic optical system according to the output of the arithmetic logic means. Alternatively, the present invention comprises an arithmetic logic means for computing the distance measurement information and positional relationships and calculating angles of the subjects relative to the center axis of the camera, and at least two flashtubes for varying their quantities of flashlight according to the information the arithmetic logic means provides and exposing the subjects to light.

The objects of advantages of the present invention will be apparent in conjunction with the detailed description below.

DETAILED DESCRIPTION OF THE PREFERRED EMBODIMENTS

Prior to explaining embodiments of a camera of the present invention, "principles of photography using a tilt mechanism" to be employed for the camera of the present invention will be described.

Figure 79:
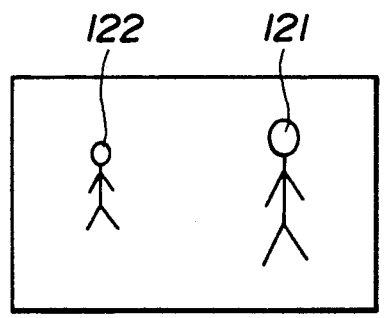
FIG. 79 is a front view showing a finder field of view in a camera in a certain photographic scene.
Figure 80:
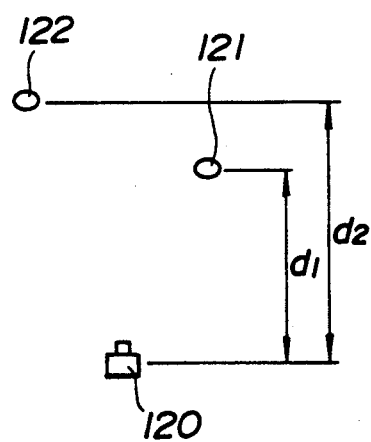
FIG. 80 is a top plan view showing the positional relationships between a camera and subjects in the photographic scene of FIG. 79.

FIG. 79 is a front view showing a finder field in a camera in a certain photographic scene. FIG. 80 is a top view showing the positional relationships between a camera 120 and subjects 121 and 122.

As shown in FIGS. 79 and 80, when the main subjects 121 and 122a are separated by distances d1 and d2 from the camera 120, conventional photography requests a photographer to lock a focus in the near subject 121. Therefore, the remote subject 122 cannot be brought into focus unless the distance d1 equals to d2.

Figure 81:
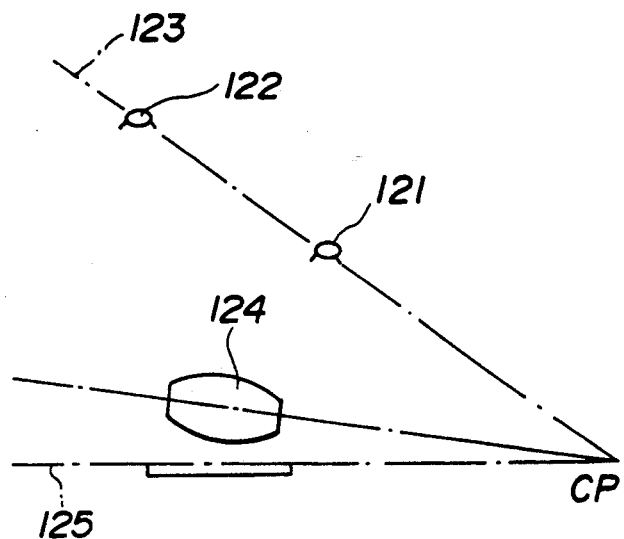
FIG. 81 is an explanatory diagram for the law of shine-proof or a principle of tilting.

FIG. 81 shows the principles of tilting performed to resolve the foregoing drawback.

Assuming that the intersection between the extension of a subject plane 123 covering the subjects 121 and 122, and the extension of an image formation plane 125 is CP, when a photographic lens system 124 is placed so that the extension of the main plane of the photographic lens will pass through the intersection CP, a focal plane on the image formation plane 125 is regarded as the subject plane 123. Therefore, an image in which the subjects 121 and 122 are in focus can be produced on the image formation plane 125. This is a law of shine-proof.

Embodiments of the present invention will be described with reference to the drawings.

Figure 1:
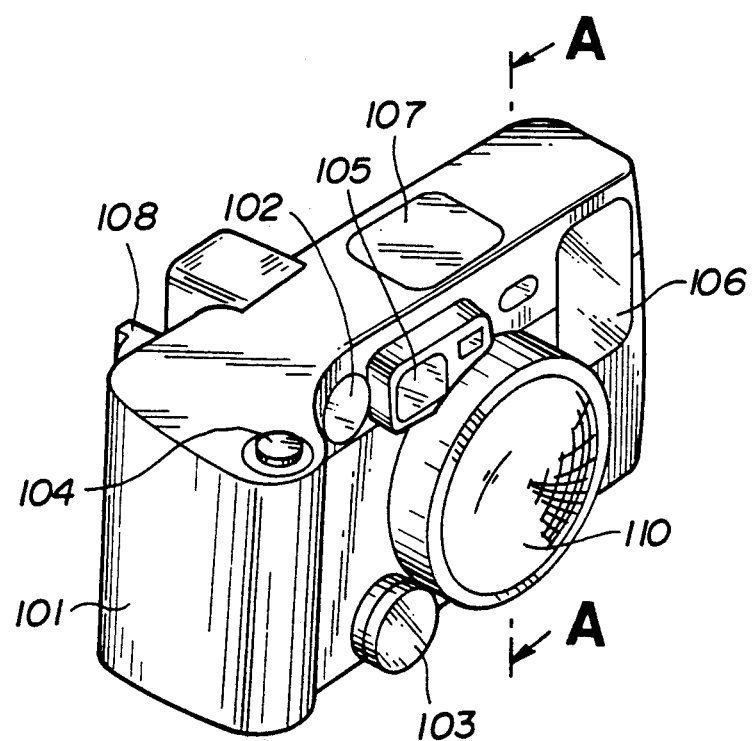
FIG. 1 is an oblique view showing an appearance of a camera having a built-in tilt mechanism of the first embodiment of the present invention.

FIG. 1 is an oblique view showing an appearance of a camera having a built-in tilt mechanism of the first embodiment of the present invention.

The camera is a lens-shutter type camera using a single-focus active type automatic focusing mechanism. A photographic lens unit 110 having a photographic lens 1 (See FIG. 2) held via a tilt mechanism to be described later is arranged in the center of the front of a camera body 101. An automatic focusing (hereafter, AF) projector 102 and its light receiver 103 are arranged in the upper and lower left of the photographic lens unit 110. A finder 105 is located in the upper left of the photographic lens unit 110. A strobe 106 serving as a flashing means is located in the upper right of the photographic lens unit 110. On the top of the camera body 101, a release button 104 capable of being pressed in two steps is arranged in the left front area, and a display 107 for setting modes and displaying the number of frames is located in the center. In the right upper area on the back of the camera body 101, a tilt lever 108 a user manipulates to actuate a tilt mechanism to be described later is arranged.

Next, the configuration of a main section will be described in detail.

Figure 2:
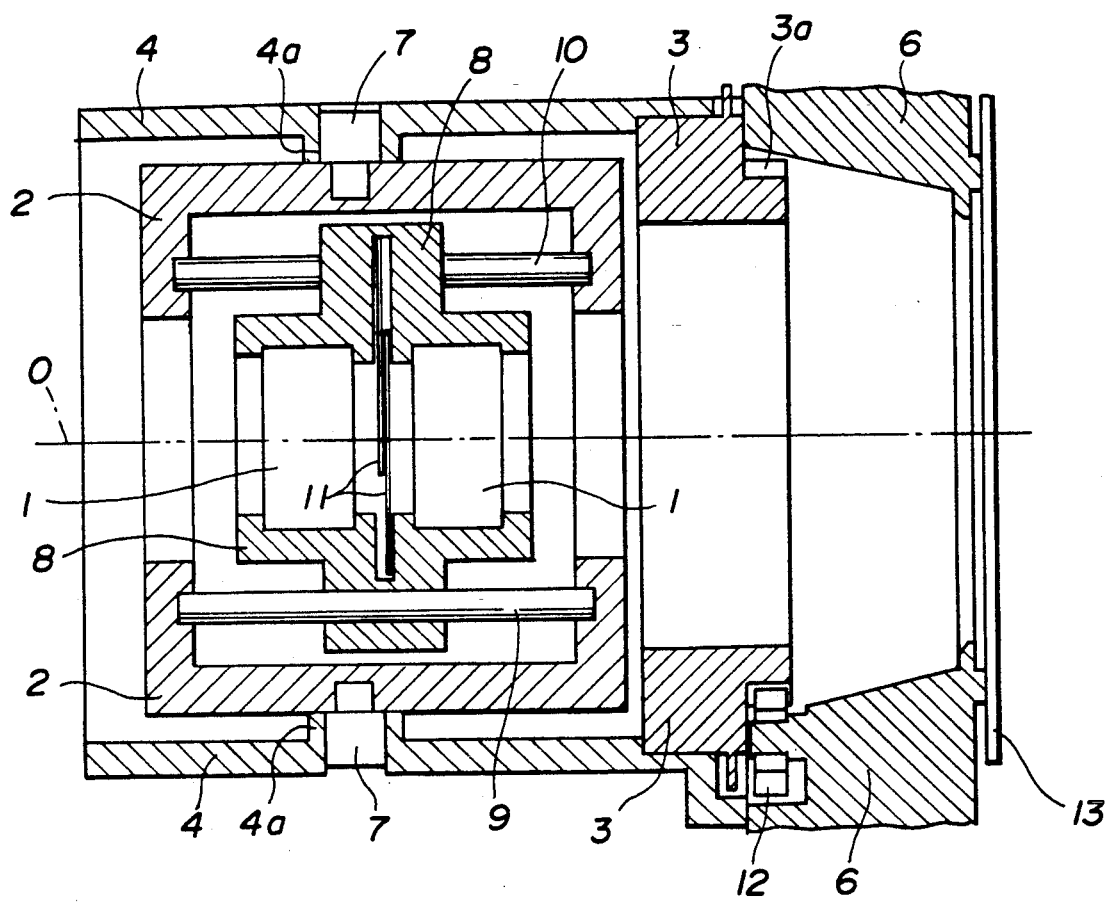
FIG. 2 shows an enlarged cross section of a photographic lens in the first embodiment looking in the direction of arrows A—A in FIG. 1.

FIG. 2 shows an enlarged A—A cross section of a photographic lens unit 110 shown in FIG. 1. In the photographic lens unit 110, a sector 11 of a shutter for exposure is arranged in the middle of a photographic lens 1,1. A lens system including the sector 11 and the photographic lens 1 is held on a lens frame 8. The lens frame 8 is held with an AF drive axis 9 and a guide axis 10 in such a way that the lens frame 8 can advance along an optical axis O. The AF drive axis 9 and guide axis 10 are locked in a swing frame 2.

The swing frame 2 is fixed with upper and lower swing pins 7. The swing pins 7 are fitted into a locking frame 4 in such a manner that the swing frame 2 can rotate freely. At this time, a step 4a of the locking frame 4 restricts vertical movement of the swing frame 2. In this state, the swing frame 2 rotates about the axis linking the upper and lower swing pins as a center line. The locking frame 4 is fixed to a body 6 with a holding member that is not shown. A tilt ring 3 engages with the right end of the inner circumference of the locking frame 4 so that the tilt ring 3 can rotate freely around the optical axis against the locking frame 4. The tilt ring 3 has a gear 3a on its outer circumference. The gear 3a engages with a gear 12 of a tilt ring drive 14 (See FIG. 6) to be described later. When the back cover (not shown) of the camera is closed, a film 13 is pressed by a platen that is not shown and held evenly (i.e. flat).

Figure 3:
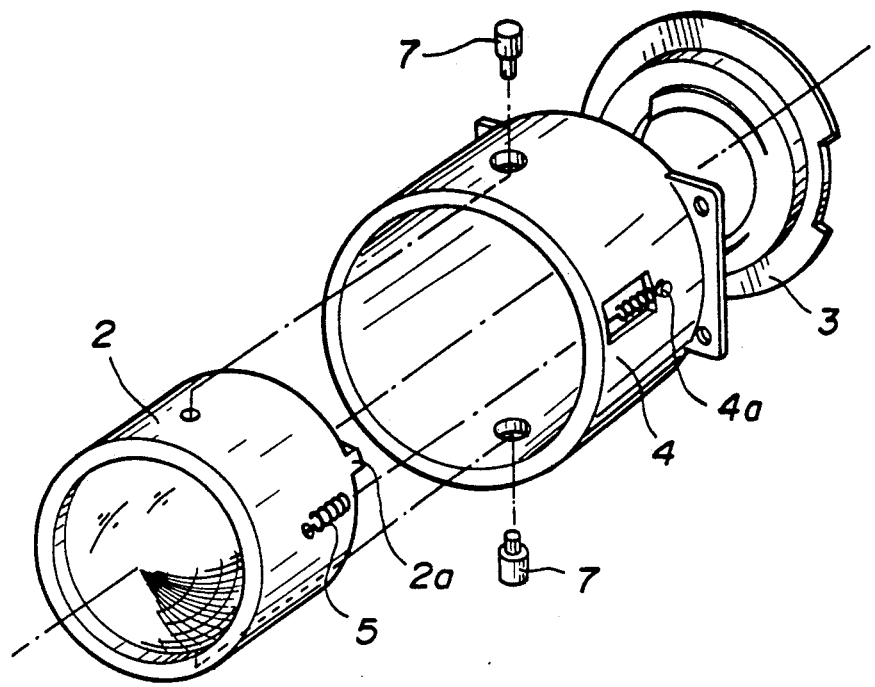
FIG. 3 is an exploded oblique view of a main section of the photographic lens.

The swing frame 2 has a cam contact 2a at a position crossing the line linking the axes of swing pins 7 almost perpendicularly as shown in the exploded oblique view of a main section in FIG. 3. The cam contact 2a is brought into contact with cams 3a and 3b that are projecting end surfaces and a flat portion of the tilt ring shown in the enlarged oblique view of FIG. 4. Thus, the cam contact 2a restricts tilting of the swing frame 2. One end of a tilt spring 5 or a coil spring is fixed at a position very close to the cam contact on the circumference of the swing frame 2. The other end of the tilt spring 5 is fixed to the locking frame 4 with a tilt spring clamp 4a (See FIG. 3). Thereby, the swing frame 2 is always pressed toward the tilt ring 3. Tilting of the swing frame 2 is restricted by rotation of the tilt ring 3.

Figure 4:
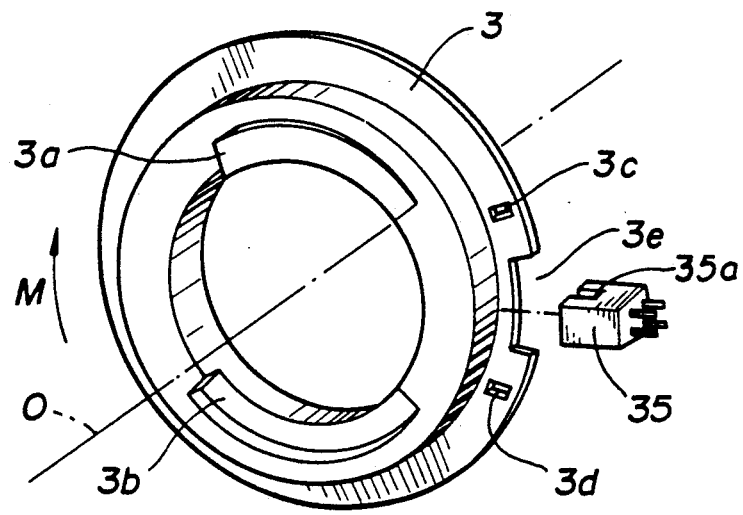
FIG. 4 is an enlarged oblique view of a tilt ring in the first embodiment.
Figure 5:
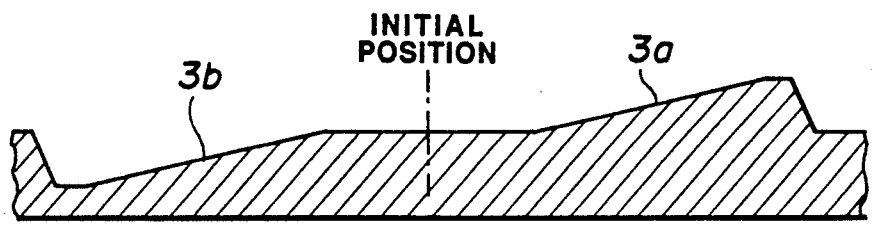
FIG. 5 is a detailed development of a cam of the tilt ring shown in FIG. 4.

The shape of the tilt ring 3 is shown in FIG. 4. FIG. 5 is a detailed development of the cams 3a and 3b. In FIG. 5, an initial position is a position for normal photography or when tilting is not carried out. A limited area across the initial position is a flat portion. The cams 3a and 3b are areas for tilting. As shown in FIG. 5, convex and concave cams are located and shaped in an opposite manner relative to the initial position.

In FIG. 4, a T trigger photo-interrupter (hereafter, PI) for detecting the rotation of the tilt ring 3 is opposed to part of the outer circumference of the tilt ring 3. The T trigger PI 35 is a known photo-interrupter, which produces an output signal when light is broken with a slit plate. A flange invasive to the slit 35a of the T trigger PI 35 and facing outward is formed on the outer circumference of the tilt ring 3. The flange has a notch 3e at a position corresponding to the initial position. Trigger holes 3c and 3d are bored at positions corresponding to the positions immediately after which the cams 3a and 3b start tilting. On the back of the tilt ring 3, a gear 3a shown in the A—A cross-sectional diagram of FIG. 2 is formed on the flange, which is hidden from view behind the outward flange in FIG. 4.

A tilt drive 14 of a drive gear 12 shown in FIG. 2 will be described in conjunction with FIG. 6.

The gear 12 engages with a gear 15, a gear 16, and a gear 17, which are double gears constituting a reduction gear array. The gear 17 is engaged with an output gear 18 fixed on an output axis of a tilt motor 33. A slit plate 20 is joined with the output axis of the tilt motor 33 as part of the output axis. A T pulse PI 34 for producing pulses according to a quantity of rotation of the tilt motor 33 is arranged on the outer margin of the slit plate 20. The T pulse PI 34 is a known photo-interrupter, which produces, similarly to the T trigger PI 35, an output signal when light is broken with a slit. The tilt driving and detecting system from the gear 12 to tilt motor 33 and to the T pulse PI 34 are held on a body 6 shown in FIG. 2 using a holding member that is not shown.

Figure 7:
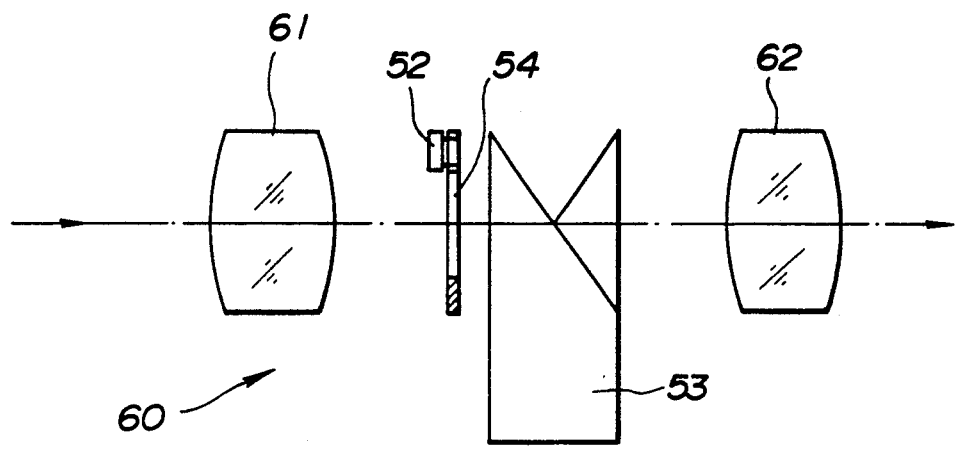
FIG. 7 is an enlarged side view showing a main section of an optical system for a finder in the first embodiment.

FIG. 7 is an enlarged view of a main section showing an optical system 60 for a finder 105.

The finder 105 is a real image type finder, wherein an image formation lens 61, a prism 53, and a magnifier 62 are arranged in tandem along the optical axis. A display mask 54 is placed near the prism 53 in the vicinity of an image formation plane of the image formation lens 61 in such a way that the display plane of the display mask 54 will be perpendicular to the optical axis. The display mask 54 forms a field frame indicating a photographic range shown in FIG. 11. A liquid crystal display 52 is placed at almost the same position as the display mask 54 so that the liquid crystal display 52 will be visible below the display mask 54 (See FIG. 11). The liquid crystal display 52 is connected to a liquid crystal drive 29 (See FIG. 9) using a member that is not shown. The liquid crystal drive 29 lights the liquid crystal display 52.

Figure 11:
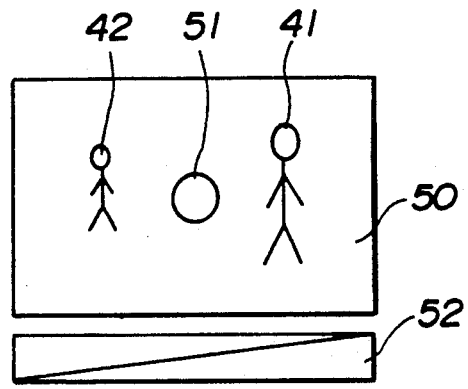
FIG. 11 is a front view showing an example of a finder field frame and a liquid crystal display viewed through an eyepiece of the camera of the first embodiment.
Figure 12:
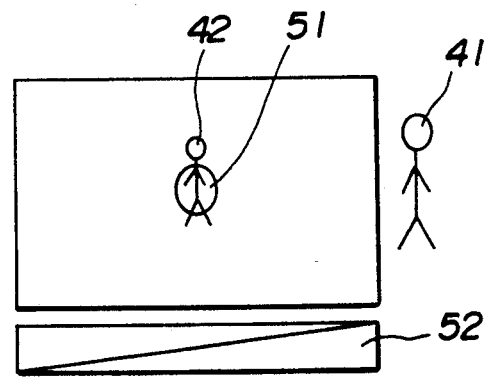
FIG. 12 is a front view of a finder field frame in which a distance to one subject is measured in the camera of the first embodiment.

FIG. 11 shows a finder field frame 50 viewed through an eyepiece (not shown). The finder field frame 50 is formed with a display mask 54 as described above. A distance measurement circle 51 is located in the center of (indicated with a circle in FIG. 11) the field frame 50 (indicated with a circle in FIG. 11). A distance measuring unit 22 to be described later measures a distance to a subject coming within the frame. In FIG. 11, subjects 41 and 42 are visualized in the right and left portions of the field frame 50.

Figure 17:
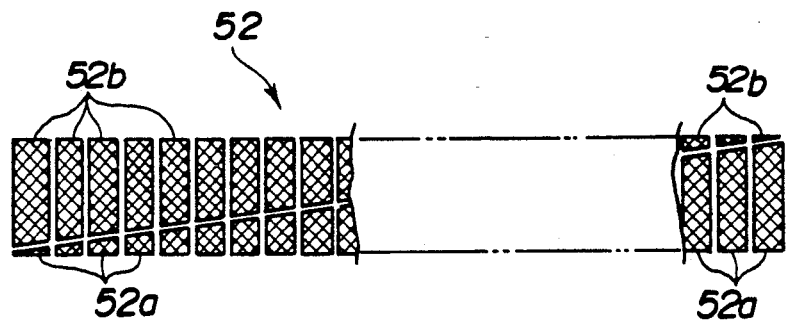
FIG. 17 is an enlarged front view showing the liquid crystal display in detail.

FIG. 17 is an enlarged front view showing a liquid crystal display 52 in detail. The liquid crystal display 52 is divided into a liquid crystal 52a and a liquid crystal 52b with respect to the diagonal line of the liquid crystal display 52. Each of the liquid crystals are made up of multiple segmented crystal fragments as shown in FIG. 17. When driven by the liquid crystal drive 29, any liquid crystal fragments light.

Figure 8:
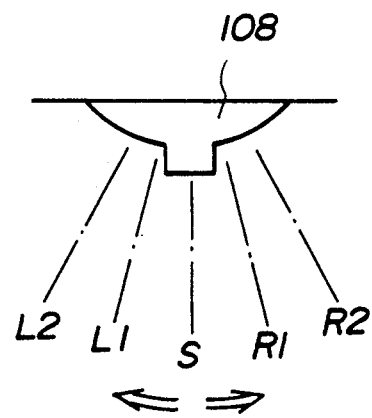
FIG. 8 shows an operational range of a tilt level in the first embodiment.

FIG. 8 shows a manipulation range of a tilt lever 108. The tilt lever 108 turns laterally. The turning is manipulated by the thumb of a user's right hand holding a grip. In the right and left manipulation range shown in FIG. 8, the tilt lever 108 can move two strokes of fixed angles on the right and left sides of the initial position S, and thus be set at four positions. The four manipulation positions include R1 where the lever 108 reaches after moving one stroke rightward, R2 where the lever 108 reaches after moving two strokes rightward, L1 where the lever 108 reaches after moving one stroke leftward, and L2 where the lever 108 reaches after moving two strokes leftward.

Figure 9:
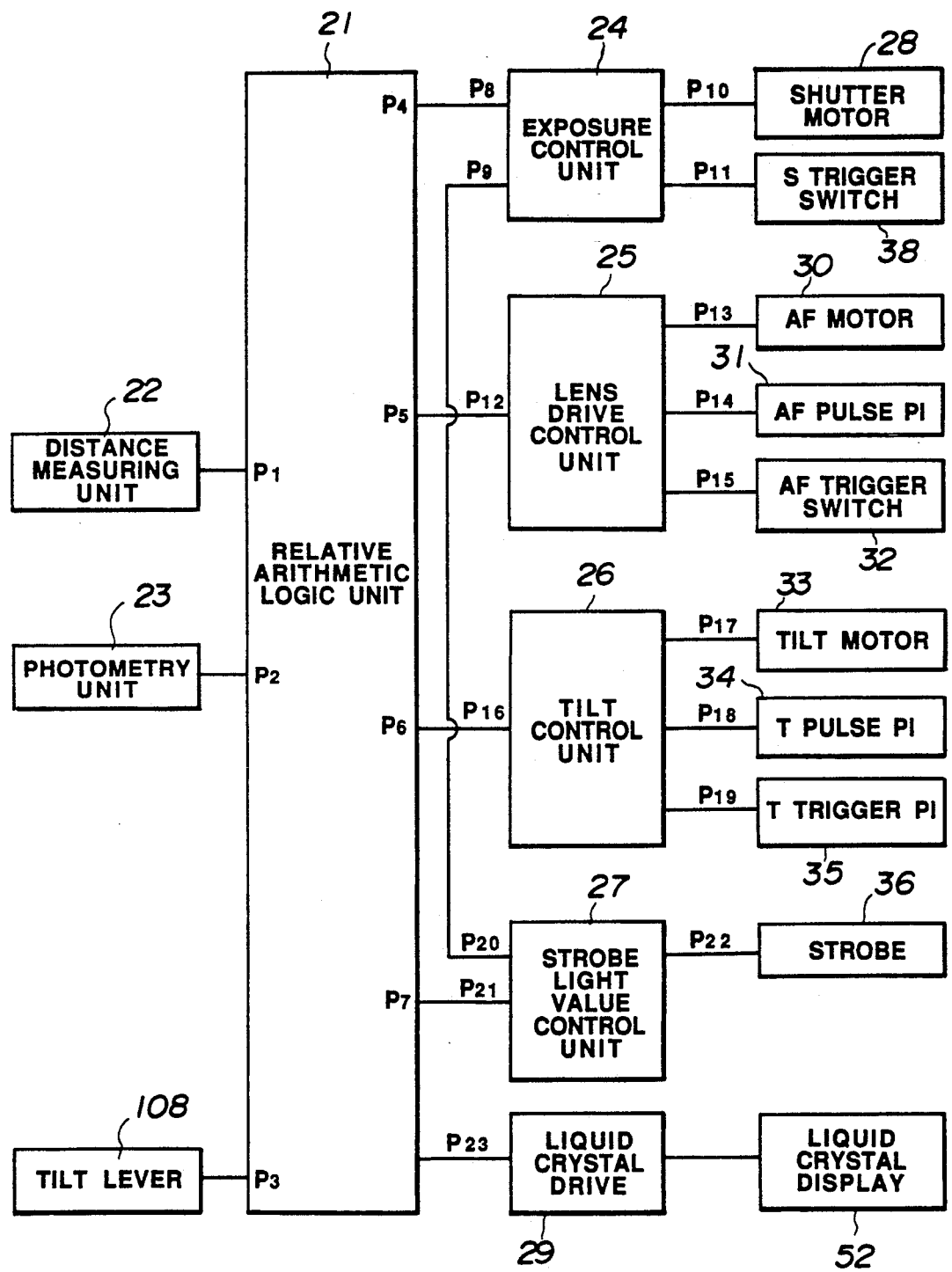
FIG. 9 is a block configuration diagram of a main section of an electric circuitry in a camera of the first embodiment.
Figure 10:
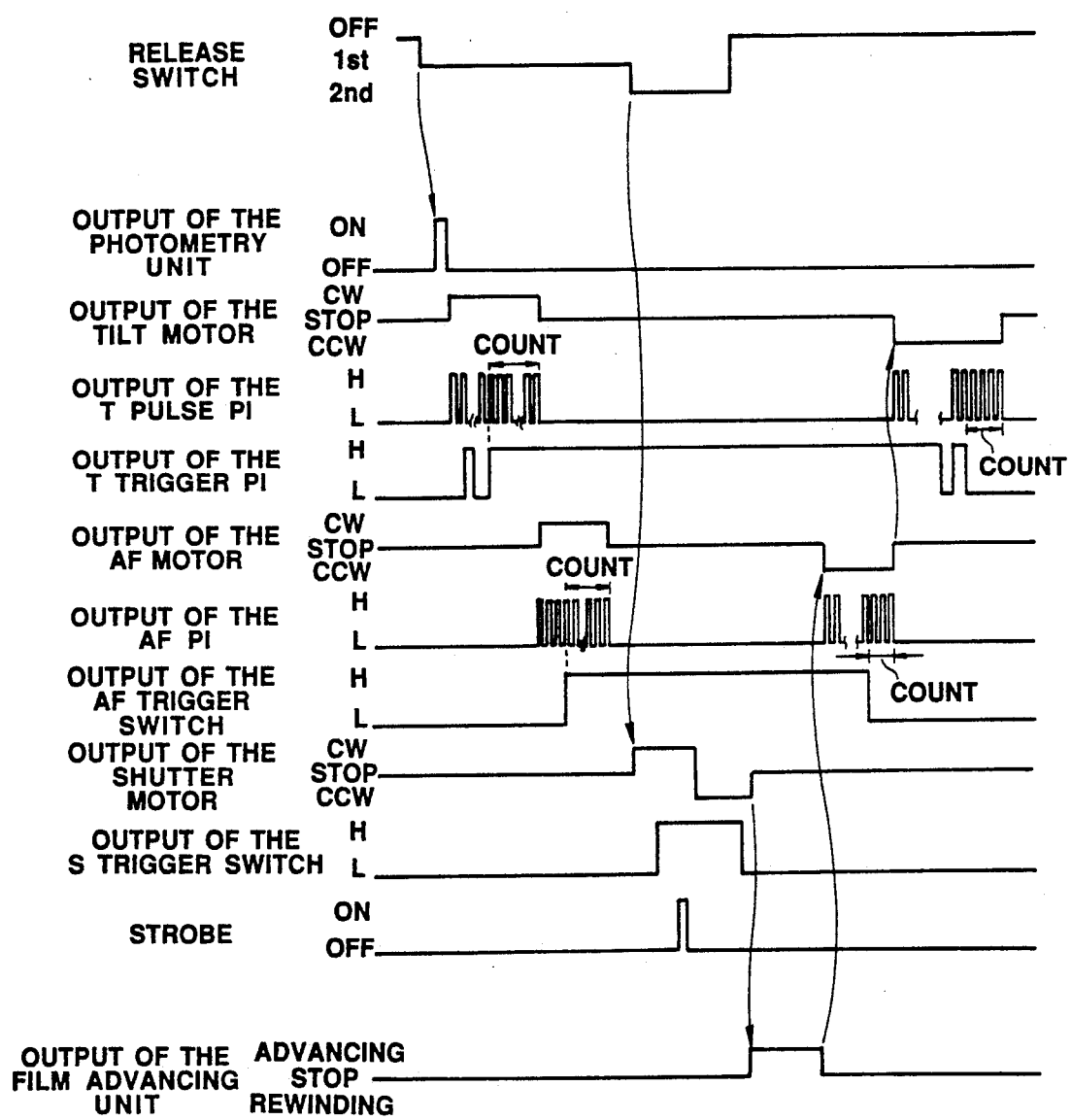
FIG. 10 is a timing chart showing operations of a main section of the camera.
Figure 28:
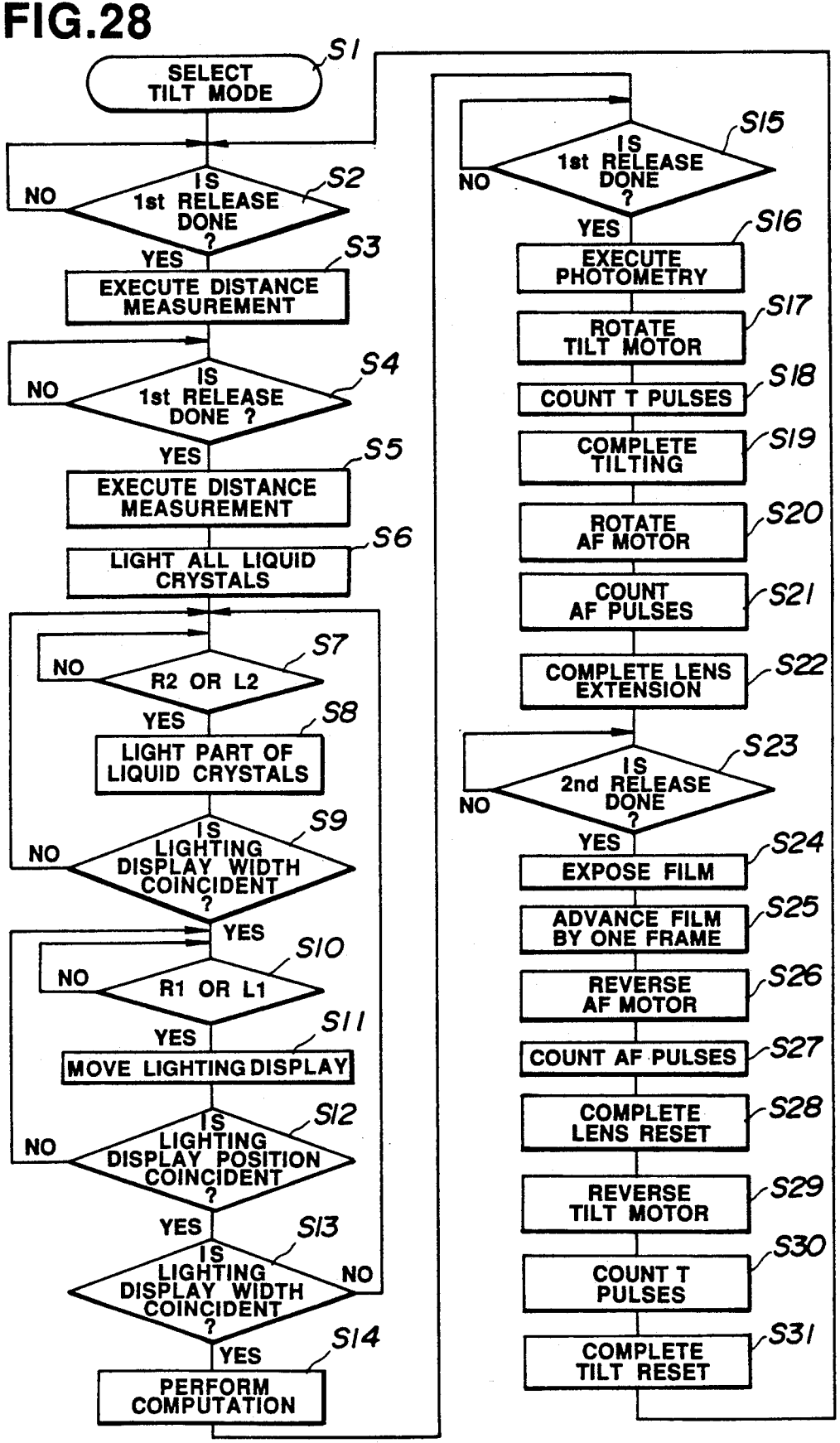
FIG. 28 is a flowchart showing the operations of the camera of the first embodiment.

FIG. 9 is a block diagram showing a main section of an electric circuitry of a camera according to the present invention. FIG. 10 is a timing chart showing the operations of the main section. FIG. 28 is a flowchart showing the operations of the main section.

As shown in FIG. 9, input pins P1, P2, and P3 of a relative arithmetic logic unit 21 are connected to output pins of a distance measuring unit 22, a photometry unit 23, and a tilt lever 108. Output pins P4, P5, P6, and P7 of the relative arithmetic logic unit 21 are connected to input pins P8, P12, P16, P21, and P23 of an exposure control unit 24, a lens drive control unit 25, a tilt control unit 26, a strobe light value control unit 27, and a liquid crystal drive 29. Output pins P10 and P11 of the exposure control unit 24 are connected to a shutter motor 28 and an S trigger switch 38. In response to an instruction from the relative arithmetic logic unit 21, the exposure control unit 24 controls drive of the motor 28 and switch 38. When receiving a signal via an output pin P9, the exposure control unit 24 controls the strobe light value control unit 27.

The output pins P13, P14, and P15 of the lens drive control unit 25 are connected to an AF motor 30, an AF pulse PI 31, and an AF trigger switch 32. In response to an instruction from the relative arithmetic logic unit 21, the lens drive control unit 25 controls drive of the AF motor 30, AF pulse PI 31, and AF trigger switch 32. The output pins P17, P18, and P19 of the tilt control unit 26 are connected to a tilt motor 33, a T pulse PI 34, and a T trigger PI 35. In response to an instruction from the relative arithmetic logic unit 21, the tilt control unit 26 controls drive of the tilt motor 33, T pulse PI 34, and T trigger PI 35.

The output pin P22 of the strobe light value control unit 27 is connected to a strobe 36. In response to instructions from the exposure control unit 24 connected to the input pin P20 and the relative arithmetic logic unit 21, the strobe light value control unit 27 controls flashing of the strobe 36. In response to an instruction from the relative arithmetic logic unit 21, the liquid crystal drive 29 controls drive of the liquid crystal display 52 as described previously.

Assuming that a camera of the present invention having the foregoing configuration is used to take photographs, the operations of the camera will be described.

A photographer merely has to press a release button 104 (See FIG. 1). Then, photography is carried out. When main subjects 41 and 42 are posed as shown in FIG. 11; that is, when the main subjects 41 and 42 are not within a distance measurement circle 51, automatic focusing is not carried out. This results in a photograph whose center is out of focus.

Figure 13:
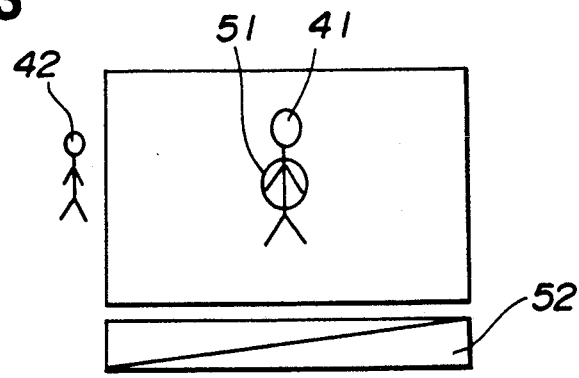
FIG. 13 is a front view of a finder field frame in which a distance to another subject is measured in the camera of the first embodiment.

A camera of this embodiment has a built-in focus lock mechanism. When the release button 104 is moved a stroke and set at the first position (this activates first release), distance measurement, photometry, computation, and lens extension are executed. When the release button is moved another stroke and set at the second position (this activates second release), exposure, lens reset, and film advancing are executed. That is to say, for a composition shown in FIG. 11, framing is done to produce the composition shown in FIG. 13. Then, first release is performed. After that, framing is done to restore the composition of FIG. 11. Then, second release is carried out.

To produce an image in which both the subjects 41 and 42 in FIG. 11 are in focus, tilting an optical lens system must be done as described previously.

Next, assuming that the camera having the built-in tilt mechanism of this embodiment is used to perform tilt photography, the operations of the camera will be described with reference to FIGS. 11 to 22 and the flowchart of FIG. 28.

First, a photographer designates a mode for actuating the tilt mechanism (tilt mode) using a member that is formed on a camera body 101 but not shown (step S1). When the Tilt mode is not designated, a Normal mode is specified to enable normal photography. When the Tilt mode is designated at the step S1, a relative arithmetic logic unit 21 (See FIG. 9) enters a state for storing two sets of distance information. Then, the photographer executes first release with a composition shown in FIG. 12; that is, with a distance measurement circle 51 agreeable to a subject 42 (step S2). Then, a distance measuring unit 22 (See FIG. 9) starts measuring the distance to the subject 42 (step S3).

The above distance measurement is identical to that for normal photography, which is carried out during first release. However, noted is that neither photometry nor lens extension is carried out. After the distance to the subject is measured at the steps S2 and S3, the camera body 101 is included. Then, the field frame is adjusted to produce a composition shown in FIG. 13. More particularly, the distance measurement circle 51 is adjusted to agree with a subject 41. Then, first release is done again (step S4). This time, the distance measuring unit 22 measures the distance to the subject 41 (step S5). At the steps S3 and S5, the aforesaid distance measurement is performed and the relative arithmetic logic unit 21 receives distance measurement information of the subjects 41 and 42 from the distance measuring unit 22, and stores the information.

Figure 14:
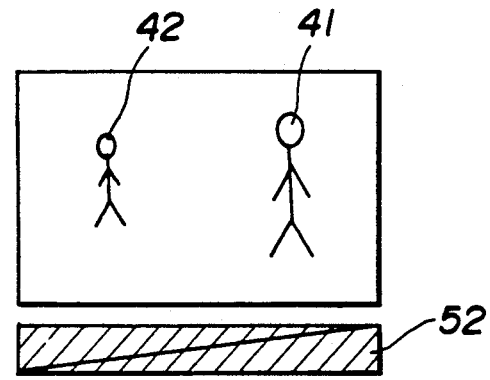
FIG. 14 is a front view showing the liquid crystal display and finder field frame in a state in which the entire liquid crystal display lights.

When first release has been performed twice, a liquid crystal display 52 lights entirely; all liquid crystal fragments of liquid crystals 52a and 52b light (step S6). FIG. 14 shows the liquid crystal display 52 and field frame 50 at this time.

After all the operations before the step S6 inclusive have been completed, the distances to the subjects 41 and 42 are placed in the relative arithmetic logic unit 21.

However, the positional relationships of the subjects 41 and 42 to an image formation plane 125 (See FIG. 81) are unknown. Therefore, a quantity of tilt of a photographic optical system cannot be determined at this stage.

In the present invention, the positional relationships of two subjects in a field frame; for example, the subjects 41 and 42 are specified through a finder. Then, a quantity of tilt of the photographic optical system is determined.

The operations to be done after the step S6 or the liquid crystal display 52 lights entirely will be described.

First, an apparent space between the subjects 41 and 42 in a finder field is measured using the liquid crystal display 52. This is achieved by manipulating a tilt lever 108. To be more specific, the tilt lever 108 is manipulated to bring the width of a lighting portion of the liquid crystal display 52 into substantial agreement with the apparent space.

Figure 16:
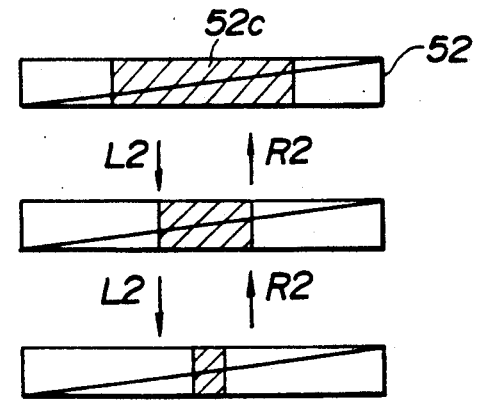
FIG. 16 shows an example of displacement of the lighting portion shown in FIG. 15 achieved by manipulating the tilt lever.

As described previously, the tilt lever 108 can be set at four positions (See FIG. 8). First, the tilt lever 108 is set at the second stroke position L2 or R2. Then, the width of the lighting portion of the liquid crystal display 52 is adjusted to agree substantially with the apparent space between the subjects 41 and 42. To be more specific, the tilt lever 108 is turned to the L2 position and held there. Then, as shown in FIG. 16, the width of the lighting portion 52c of the liquid crystal display 52 shrinks gradually toward the center. When the tilt lever 108 is turned to the R2 position and held there, the width of the lighting portion 52c extends gradually.

Figure 15:
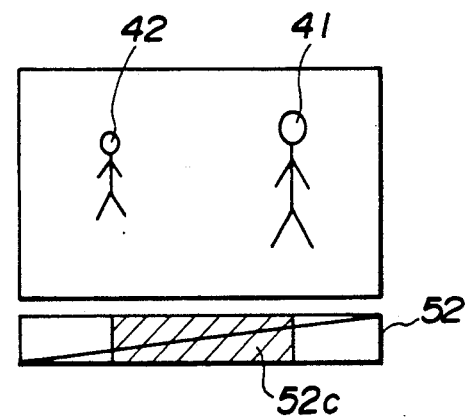
FIG. 15 is a front view showing an example of the liquid crystal display and finder field frame appearing when the width of the lighting portion of the liquid crystal display agrees with the space between subjects within the finder field frame.

Now, the photographer turns the tilt lever 108 to L2 or R2 (step S7), so that the width of the lighting portion 52c will agree with the space between the subjects 41 and 42 in the field frame. Then, when the width of the lighting portion 52c agrees with the space between the subjects 41 and 42, the photographer releases the turning force for the tilt lever 108 (which means that the photographer releases his/her finger from the tilt lever 108). Thereby, the lever 108 is reset to the initial position S instantaneously. Then, transition of the width of the lighting portion 52c stops. FIG. 15 shows the liquid crystal display 52 and field frame at this stage.

Figure 18:
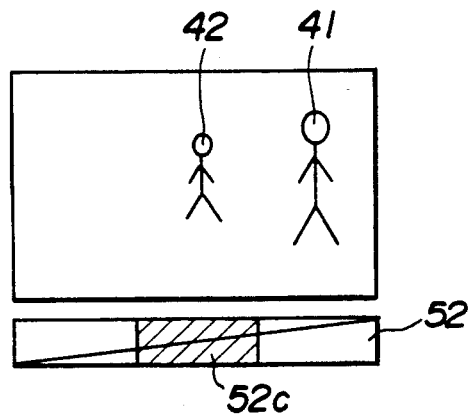
FIG. 18 is a front view showing other example of the liquid crystal display and finder field frame appearing when the width of the lighting portion of the liquid crystal display agrees with the space between subjects within the finder field frame.
Figure 19:
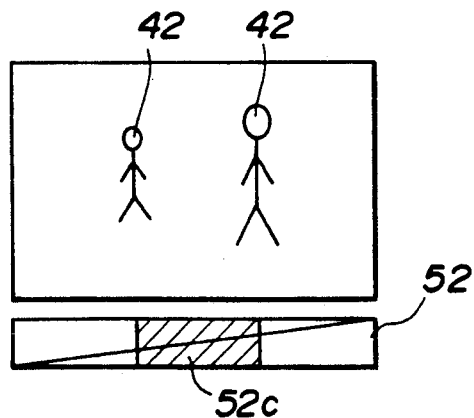
FIG. 19 is a front view showing other example of the liquid crystal display and finder field frame appearing when the width of the lighting portion of the liquid crystal display agrees with the space between subjects within the finder field frame.

By the way, subjects are not always posed as shown in FIG. 11 or not always symmetric with respect to the center of a photographic angle of field, but usually posed as shown in FIG. 18. In this case, a photographer must frame the scene as shown in FIG. 19, then carry out the aforesaid manipulation. This is because the width of the lighting portion 52c appears symmetrically with respect to the center of the liquid crystal display 52. After that, the photographer carries out re-framing to restore the composition of FIG. 18.

When the foregoing manipulation or a manipulation for bringing the width of the lighting portion 52c into agreement with the space between the subjects 41 and 42 is complete, the liquid crystal display 52 and field frame look like FIG. 19. Immediately after that, the lighting portion 52c enters a state shown in FIG. 20 (step S8). At this time, the width of the lighting portion 52c is identical to that shown in FIG. 19. However, only the lower liquid crystal 52a below the diagonal line of the liquid crystal display is illuminated.

When the width of the lighting portion 52c disagrees with the space between the subjects 41 and 42, control returns to the step S7. Then, the aforesaid operations are repeated until the width of the lighting portion 52c agrees with the space between the subjects 41 and 42 (step S9).

Next, the tilt lever 108 is set at the first stroke position L1 or R1, it is specified where the apparent space between the subjects 41 and 42 that has been determined by performing the aforesaid operations is located in the photographic screen.

Figure 22:
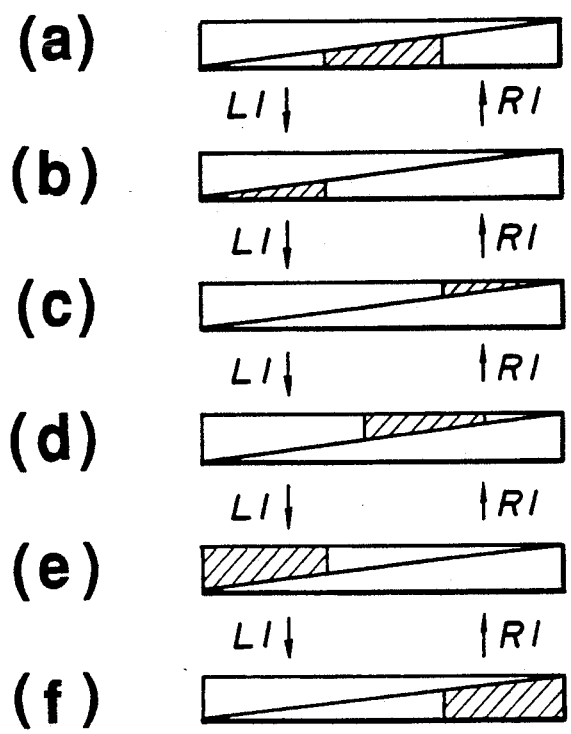
FIG. 22 is a front view showing the transition of a lighting portion achieved by turning the tilt lever to an L1 or R1 position.

The tilt lever 108 is turned to the L1 position and held there. Then, the lighting portion 52c of the liquid crystal display 52 shifts leftward gradually with its width constant as shown in FIG. 22. When the tilt lever 108 is turned to the R1 position and held there, the lighting portion 52c shifts gradually rightward or the inverse directly of that when the tilt lever 108 is set at the L1 position.

When the lighting portion 52c is located in the center of the lower liquid crystal 52a (in the state shown in FIG. 22a), if the tilt lever 108 is turned to L1 and held there, the lighting portion 52c shifts leftward as described above. After the left end of the lighting portion 52c reaches the left end of the liquid crystal display 52 (FIG. 22b), the lighting portion 52c passes the left end and appears at the right end of the upper liquid crystal 52b as shown in FIG. 22c. After that, when the tilt lever 108 is held at the L1 position, the lighting portion 52c shifts in the order of FIGS. 22d, 22e, and 22f. When the tilt lever 108 is turned to R1 and held there, the lighting portion 52c shifts in the reverse order or in the order of FIGS. 22f to 22a.

The photographer manipulates the tilt lever 108 as mentioned above; that is, turns the tilt lever 108 to R1 and holds it there (step S10). Thereby, the lighting portion 52c is moved (step S11) and brought into agreement with the positions of the subjects 41 and 42 (See FIG. 23). Then, the operations of and after the step S10 are repeated until the lighting portion 52c reaches an intended position (step S12). After the step S12, the width of the lighting portion 52c is checked again (step S13). Then, the operations of the steps S7 to S13 are repeated until the width agrees with the space between the subjects 41 and 42.

After the above sequence of operations is complete, data representing the positional relationships of the two subjects 41 and 42 is put in the relative arithmetic logic unit 21. The data is used to compute a quantity of tilt of a photographic optical system (step S14). That is to say, when the tilt lever 108 is manipulated to set the lighting portion 52c at the position shown in FIG. 23, the tilt lever 108 is returned to the initial position S. At this time, the relative arithmetic logic unit 21 carries out the aforesaid computation and stores the results of the computation. After the step S14, the relative arithmetic logic unit 21 enters a standby state and waits for the next release (step S15).

Figure 20:
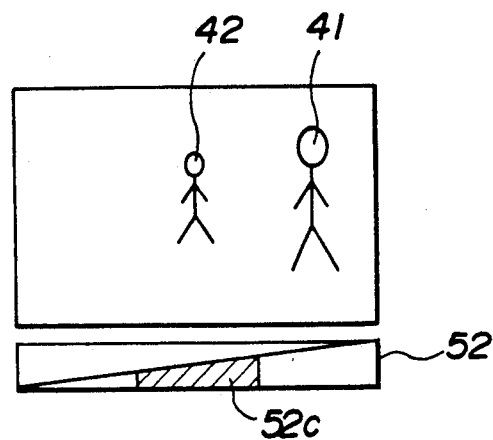
FIG. 20 is a front view showing an example of the liquid crystal display and finder field frame appearing after the width of the lighting portion of the liquid crystal display is adjusted to agree with the space between subjects within the finder field frame, then back-and-forth relationships of the subjects are determined.
Figure 21:
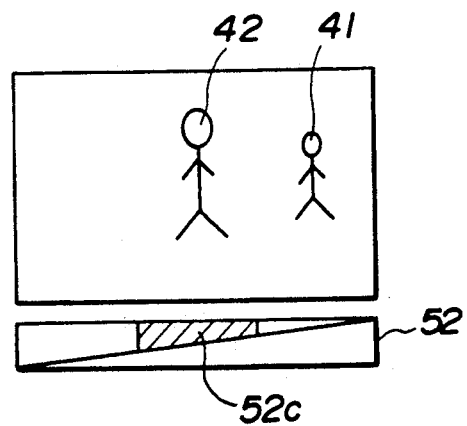
FIG. 21 is a front view showing other example of the liquid crystal display and finder field frame appearing after the width of the lighting portion of the liquid crystal display is adjusted to agree with the space between subjects within the finder field frame, then back-and-forth relationships of the subjects are determined.

FIGS. 20 and 21 show the subjects 41 and 42, and the lighting portion 52c. In FIG. 20, the lighting portion 52c is located in the lower liquid crystal 52a. In FIG. 21, the lighting portion 52c is located in the upper liquid crystal 52b. The two drawings show differently tilting subjects. More particularly, when the right subject 41 lies nearer to the camera than the left subject 42 as shown in FIG. 20, the photographer manipulates the tilt lever 108 to move the lighting portion 52c to the lower liquid crystal 52a expanding rightward. On the contrary, when the right subject 41 lies farther from the camera than the left subject 42 as shown in FIG. 21, the tilt lever 108 is manipulated to move the lighting portion 52c to the upper liquid crystal 52b expanding leftward. Thus, the back-and-forth relationship between the subjects is defined.

Figure 82:
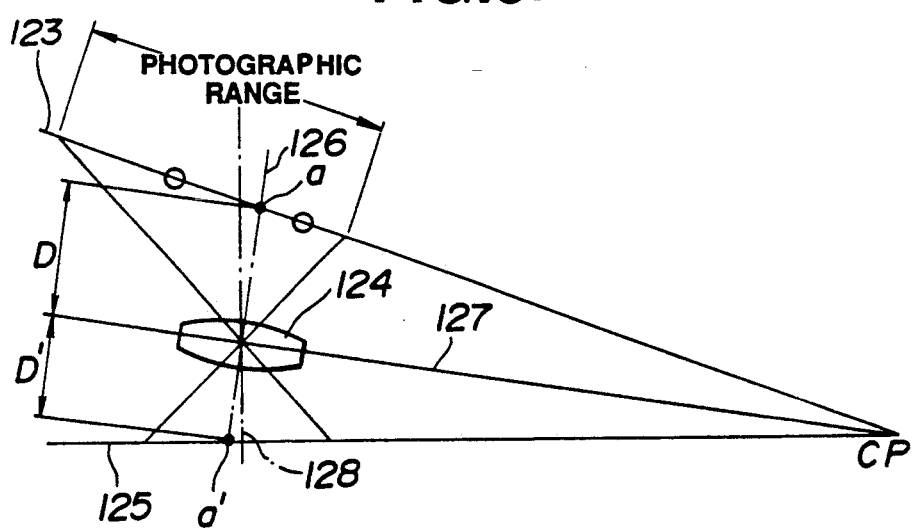
FIG. 82 is another explanatory diagram for the law of shine-proof or a principle of tilting.
Figure 83:
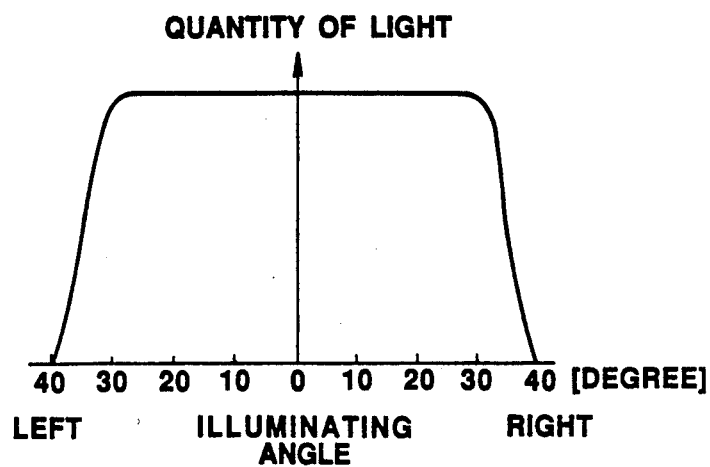
FIG. 83 shows a lighting characteristic in the longitudinal direction of a screen in a conventional strobe.
Figure 84:
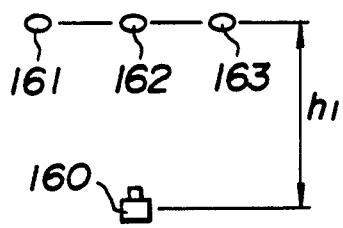
FIG. 84 is an explanatory diagram for explaining conventional strobe photography to be done when multiple subjects reside at the same distance.
Figure 85:
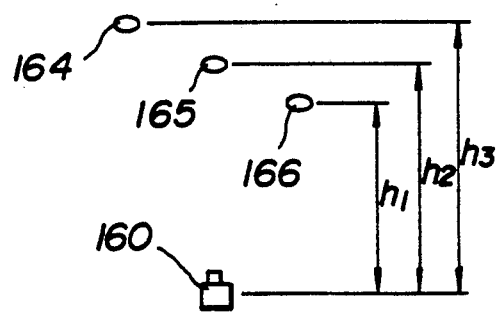
FIG. 85 is an explanatory diagram for explaining conventional strobe photography to be done when multiple subjects reside at different distances.

The principles of the aforesaid computation will be described in conjunction with FIG. 82.

A subject plane 123 is specified according to distance measurement data. An image formation plane 125 is stationary. Therefore, only one intersection CP is established. An extension 127 of the main plane of a photographic lens 124 must pass through the intersection CP.

As for image formation, a point a on the subject plane 123 located on the optical axis 126 of the photographic lens 124 must form its image at an intersection a' between the image formation plane 125 and optical axis 126. This relationship is expressed as the following well-known expression:

$$1/D' = 1/D + 1/f$$

where, D represents a distance from the point a to the main plane of the photographic lens 124, D', a distance from the main plane to the point a', and f, a focal distance of the photographic lens 124. Then, the D and D' values assume a plus sign in the advancing direction of a beam passing through the photographic lens 124.

A relative arithmetic logic unit 21 (See FIG. 9) determines a quantity of tilt and a quantity of lens extension necessary for the photographic lens 124 so that the above two relationships will be satisfied.

Strictly speaking, in a camera of this embodiment, a photographic optical system is tilted using a point on the main plane of the photographic lens 124 as a center. The center of the photographic lens 124 (center on the main plane) is not always located on a perpendicular 128 in the center of the image formation plane 125 (center of the photographic screen). This results in a deviation.

Therefore, needless to say, the photographic lens 124 is designed to tolerate the deviation. A quantity of a deviation from the perpendicular 128 leads to a slight change in an actual photographic screen range. However, since the quantity of the deviation is negligible, the change causes no problem in practical use.

Turning and holding a tilt lever 108 is not restricted to one turn and hold. When correction is needed, the tilt lever 108 can be turned to any of L1, L2, R1, and R2 repeatedly. The relative arithmetic logic unit 21 computes a quantity of tilt necessary for the photographic optical system every time the tilt lever 108 is turned.

Description of the operations of the camera of this embodiment will be resumed in conjunction with FIG. 28.

A relative arithmetic logic unit 21 is in a standby state to wait for release. When release is carried out, the camera of this embodiment acts differently than it does in Normal mode. That is to say, when the first release is performed, photometry, tilt drive, and photographic lens extension are carried out. With the second release, exposure, film advancing, photographic lens reset, and tilt reset are carried out.

First, when detecting the first release, the relative arithmetic logic unit 21 (See FIG. 9) controls a photometry unit 23 to perform photometry (step S16). Next, based on the information of a quantity of tilt that has been acquired by performing the above operation and stored in the relative arithmetic logic unit 21, the relative arithmetic logic unit 21 issues an instruction to a tilt control unit 26 and thus rotates a tilt motor 33 (step S17). The tilt control unit 26 detects output signals of a T pulse PI 34 and a T trigger PI 35, and thereby controls rotation of the tilt motor 33.

The mechanism of actuating a photographic lens 1 will be described in conjuction with FIGS. 2 to 6 and the timing chart for control.

Figure 6:
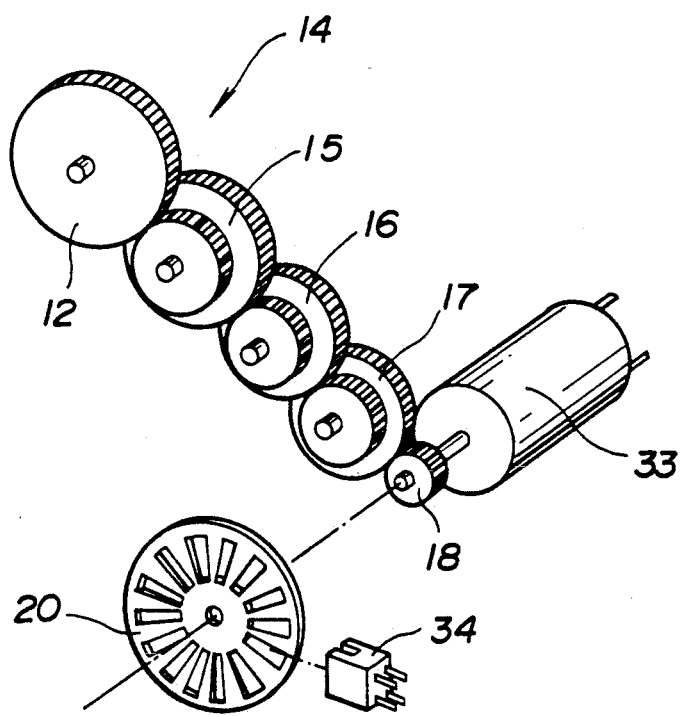
FIG. 6 is an enlarged oblique view showing a tilt ring drive for driving the tilt ring in the first embodiment.

In FIG. 6, a tilt motor 33 is a reversible motor. Thereby, a tilt ring becomes reversible. Immediately after being driven by the tilt motor 33, the tilt ring 3 shown in FIG. 4 lies at the initial position. A T trigger PI 35 is monitoring a position corresponding to a notch 3e. Therefore, the output of the T trigger PI 35 is high. In FIG. 6, slits on a slit plate 20 that rotates as part of the output axis of the tilt motor 33 move in a transducer of a T pulse PI 34. Therefore, the T pulse PI 34 outputs pulses synchronous to rotation of the tilt motor 33 to a tilt control unit 26 (See FIG. 9). The tilt control unit 26 outputs the pulses to a relative arithmetic logic unit 21. However, the relative arithmetic logic unit 21 instructs the tilt control unit 26 not to count the outputs of the T pulse PI 34 but to drive the tilt motor 33 (See FIG. 10).

As the tilt ring 3 rotates in an M-arrow direction, the intermediate part between a slit 3e and a slit 3c on a flange of the tilt ring 3 moves in the transducer of the T trigger PI 35. As the tilt ring 3 further rotates, the 3c hole passes through the transducer 35. The output of the T trigger PI 35 changes its level from high through low to high. When the output is driven high or when the hole 3c passes through the transducer, a trigger signal is supplied. With the trigger signal, the relative arithmetic logic unit 21 starts counting the number of pulses sent from the T pulse PI 34 (step S18 in FIG. 28, and FIG. 10).

A point at which pulse counting starts lies on the right of the center flat portion in FIG. 5. At this stage, a photographic optical system has not started tilting.

A required number of pulses sent from the T pulse PI 34 is determined at the time when a quantity of tilt of a photographic lens 1 is computed. The tilt motor 33 is driven so that a pulse count or a total number of pulses acquired from when a trigger signal is supplied until the tilt ring 3 stops will be consistent with the required number of pulses. In the camera of this embodiment, the tilt motor 33 is slowed down when about 20 pulses are left in the required number of pulses, thus making it possible to control a tilt position with an error of +1 pulse relative to the required number of pulses.

Figure 25:
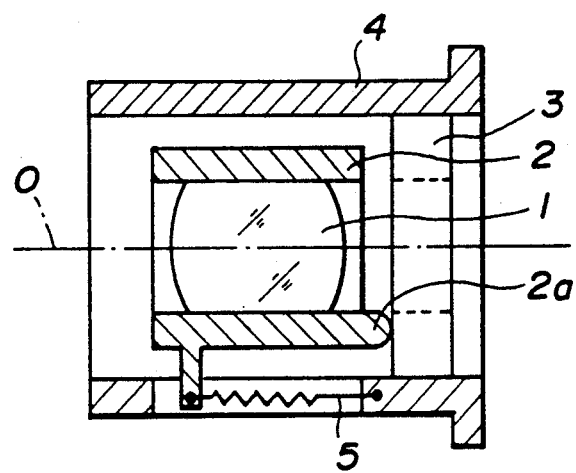
FIG. 25 is a cross-sectional diagram showing a photographic lens held on a swing frame in the camera of the first embodiment and put in an initial tilt state.
Figure 26:
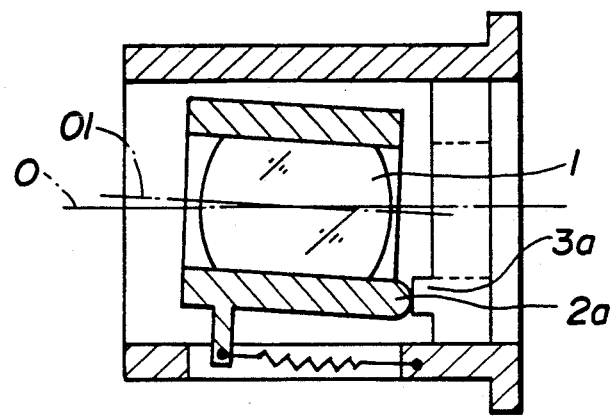
FIG. 26 is a cross-sectional diagram showing the photographic lens held on the swing frame in the camera of the first embodiment and having completed tilting.
Figure 27:
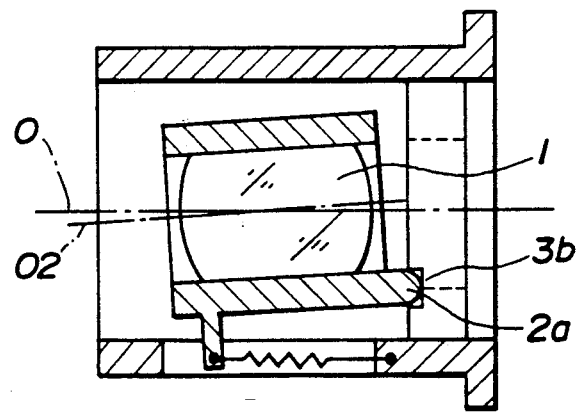
FIG. 27 is a cross-sectional diagram showing the photographic lens held on the swing frame in the camera of the first embodiment and tilted in a reverse direction of the tilting of FIG. 26.

FIGS. 25 to 27 show tilt states of a photographic lens 1 held on a swing frame 2 of the camera of this embodiment. FIG. 25 shows an initial state. In FIG. 26, tilting has been completed by performing the aforesaid operation (step S19 in FIG. 28), then the optical axis O of the photographic lens 1 has tilted in the O1 direction. In FIG. 27, a tilt ring 3 has rotated in a reverse direction of an arrow-M direction, then the optical axis O of the photographic lens 1 has tilted in the O2 direction.

A photographic optical system tilts as mentioned above. In this embodiment, a cam contact 2a of a swing frame 2 is always pressed on the tilt ring 3 because of the presence of a tilt spring 5 so that the swing frame 2 can swing freely. Thereby, the swing frame 2 can rotate with respect to the line linking the center axes of the swing pins 7. However, the swing frame 2 has its rotation restricted by cam surfaces 3a and 3b of the tilt ring 3 (See FIG. 4). Therefore, the states shown in FIGS. 26 and 27 can be held stable.

When tilting the photographic optical system is completed by performing the foregoing operation (step S19), the relative arithmetic logic unit 21 issues an instruction to a lens drive control unit 25 and thereby rotates an AF motor 30 (step S20). Then, pulses sent from an AF pulse PI 31 and an AF trigger switch 32 are counted (step S21) and lens extension is executed (step S22). In the camera of this embodiment, the quantity of extension is calculated when a quantity of tilt required for focusing a subject plane 123 shown in FIG. 81 is computed by the relative arithmetic logic unit 21 (See FIG. 9). Both the operations of tilt and lens extension make it possible to produce sharp images on an image formation plane.

Extension of a photographic lens 1 is driven when a lens frame 8 is moved linearly along the optical axis O. The radial movement of the lens frame 8 relative to the swing frame 2 is restricted by an AF drive axis 9 and a guide axis 10. The AF motor 30, which is not shown, drives an AF cam to extend the photographic lens 1. The AF motor and AF cam are installed in the swing frame 2.

The lens drive control unit 25 for controlling extension is connected with, as shown in FIG. 9, the AF motor 30 for extension drive, AF pulse PI 31 for detecting a rotation angle of the AF motor 30, and AF trigger switch 32 for detecting a reference position for extension. The driving method for the camera of this embodiment is similar to the method explained for tilt drive. The AF motor 30 is rotated clockwise so that the number of output pulses the AF pulse PI 31 provides with the AF trigger switch 32 on will be consistent with a required number of pulses computed in advance. Thus, extension of the photographic lens 1 is controlled (See the timing chart of FIG. 10). This sequence of operations is activated by the first release of a release button 104.

Next, the operations activated by the second release of the release button 104 for executing exposure will be described.

Opening and closing a sector 11 shown in FIG. 2 enables exposure. The sector 11 is driven directly by a motor according to a well-known technology. The opening and closing are synchronized with rotation and reversion of a shutter motor 28 (See FIG. 9). Then, as shown in the block diagram of FIG. 9 and the timing chart of FIG. 10, exposure is carried out by the shutter motor 28 and an S trigger switch 38 that are controlled by an exposure control unit 24 when the second release is performed (step S23).

Then, the exposure time can be varied by controlling the rotation time and pause time of the shutter motor 28. When a value computed by performing photometry during the first release represents a high speed in seconds and strobe lighting is unnecessary, after the second release is performed, exposure is accomplished only by an exposure control system. However, when a subject is dark, if the computed photometric value represents a low speed in seconds and suggests a possibility of manual blurring, the camera of this embodiment automatically actuates a strobe 36 to flash light and performs photography.

When the flashing of the strobe 36 thus terminates (step S24), the shutter motor 28 reverses, and the sector 11 returns to the initial closed state. When the shutter motor 28 stops, exposure terminates.

Next, as shown in the timing chart of FIG. 10, when exposure terminates, a film advancing drive, which is not shown, advances a film by one frame (step S25 of FIG. 28). Then, when film advancing terminates, the AF motor 30 for extending a lens rotates counterclockwise (steps S26 and S27). Then, a photographic lens 1 is reset to an initial position (step S28). Next, when resetting the lens is complete, a tilt motor 33 for tilt drive is reversed (steps S29 and S30). Then, the tilt ring is reset to the initial position (step S31). If the tilt motor 33 is rotating clockwise as shown in FIG. 10 during the tilting, the tilt motor 33 is driven counterclockwise by the resetting.

When the resetting is complete, the strobe system is charged with electricity. When the main capacitor of the strobe is fully charged, charging terminates. Thus, the sequence is complete.

The operation to be done when the tilt ring 3 is rotated in the M-arrow direction has been described in conjunction with FIG. 4. When a subject plane 123 (See FIG. 81) is inclined to the opposite side or when the positional relationships of subjects are reversed (See FIGS. 20 and 21), in this embodiment, the tilt ring 3 is, needless to say, reversed.

Using a camera having a built-in tilt mechanism of this embodiment having the aforesaid configuration, a photographer can designate two main subjects he/she intends within a finder field frame. Based on the distance measurement information and information of positional relationships of the designated main subjects, the camera computes a required quantity of tilt of a photographic optical system, then drives tilting of the photographic optical system. Therefore, what the photographer has to do after designating subjects is to perform release. Thus, the photographer can achieve tilt photography without doing any complex manipulation.

In this embodiment, photometry in Tilt mode is achieved by performing average photometry after the first release. Alternatively, a spot photometry function may be incorporated. Then, spot photometry may be interlocked with distance measurement that is performed twice when distances to subjects are measured. Thus, spot photometry may be performed twice. Then, an average of metered values resulting from the photometry is stored together with the quantity of tilt in a relative arithmetic logic unit 21. Thereby, tilt is driven immediately after the first release. This enables exposure more suitable to the subjects.

Next, a camera having a built-in tilt mechanism of the second embodiment of the present invention will be described with reference to the drawings.

The camera of the second embodiment has the same configuration and operation as that of the first embodiment. However, the finder optical system is different. Only the difference will be described.

Figure 29:
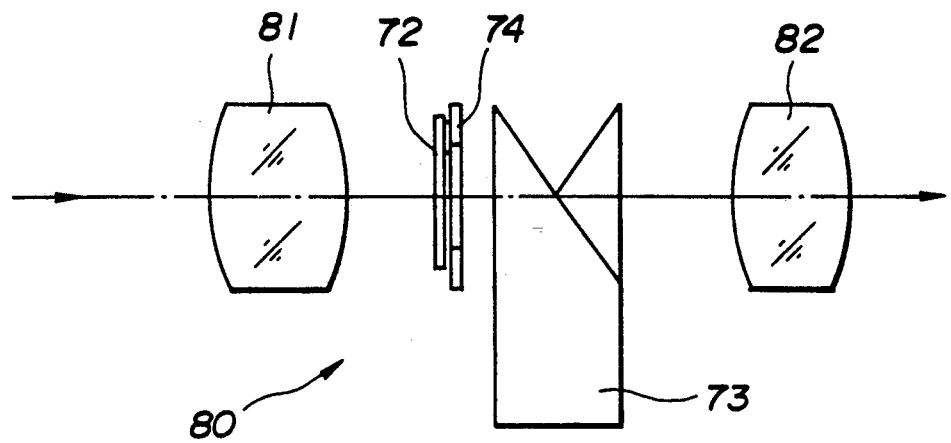
FIG. 29 is an enlarged side view showing a main section of a finder optical system in a camera of the second embodiment of the present invention.

FIG. 29 is an enlarged view of a main section of a finder optical system 80 in the second embodiment.

The finder optical system 80 constitutes a real-image type finder similar to that in the first embodiment. An image formation lens 81, a prism 73, and a magnifier 82 are arranged in tandem along the optical axis. In the vicinity of an image formation plane of the image formation lens 81 and on the side of the prism 73, a display mask 74 is arranged in such a manner that its display surface will be perpendicular to the optical axis. Thus, the display mask 74 forms a field frame 70 representing a photographic range as shown in FIGS. 30 to 33. In the vicinity of the display mask 74 and on the side of the image formation lens 81, a liquid crystal display 72 lies to overlap the field frame of the display mask 74 (See FIG. 30). The liquid crystal display 72, similar to that in the first embodiment, is connected to a liquid crystal drive 29 (See FIG. 9) using a member that is not shown, and driven by the liquid crystal drive 29.

Figure 30:
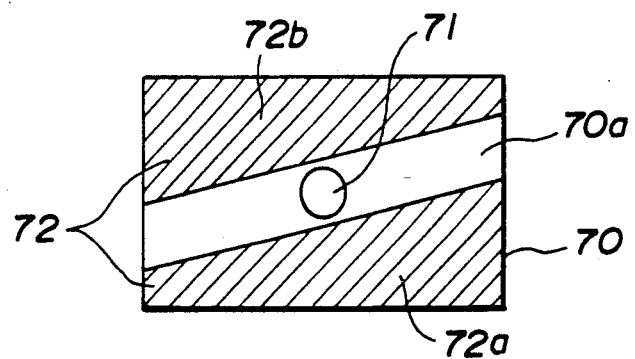
FIG. 30 is a front view showing an example of a finder field frame and a liquid crystal display viewed through an eyepiece of the camera of the second embodiment.
Figure 31:
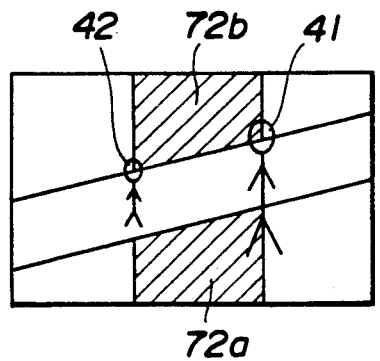
FIG. 31 is a front view showing an example of the liquid crystal display and finder field frame appearing when the width of the lighting portion of the liquid crystal display of FIG. 30 agrees with the space between subjects within the finder field frame.

FIG. 30 shows a finder field frame 70 viewed through an eyepiece (not shown). The finder field frame 70 is formed with a display mask 74. Similar to the first embodiment, a distance measurement circle 71 is arranged in the center of the field frame 70 (indicated with a circle in FIG. 30). A distance measuring unit 22 is used to measure a distance to a subject coming within this circle.

Figure 33:
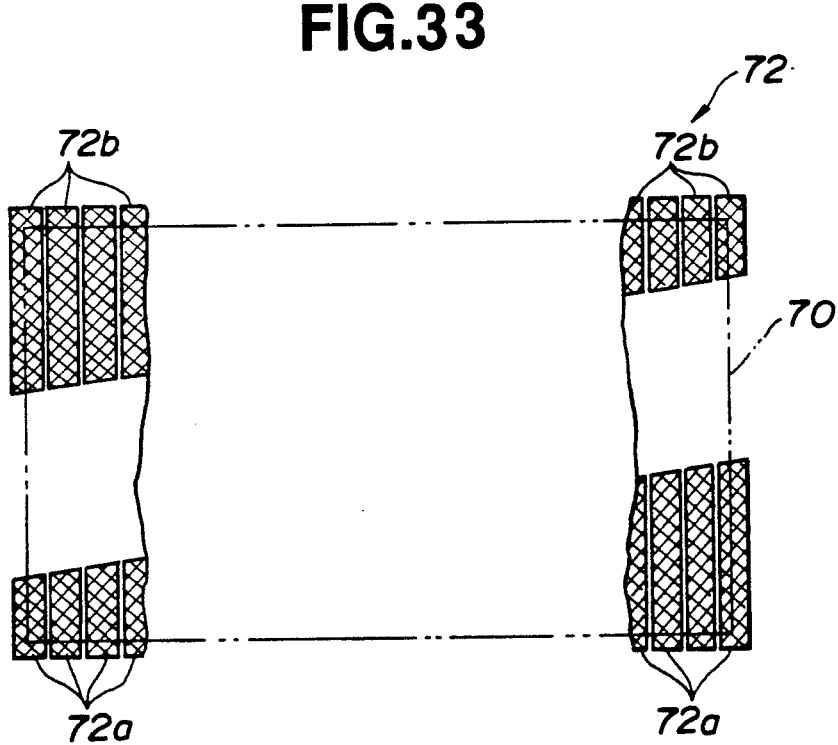
FIG. 33 is an enlarged front view showing the liquid crystal display of FIG. 30 in detail.

A liquid crystal display 72 is, as shown in detail in the enlarged front view of FIG. 33, divided into a lower display portion 72a and an upper display portion 72b by a band-like transmission area 70a that is rising from the lower left side through the center to the right upper side on the liquid crystal display 72. Multiple segmented liquid crystal fragments are laid in each of the display portions as shown in FIG. 33. The liquid crystal fragments are driven independently by a liquid crystal drive 29. The liquid crystal display 72 transmits light in Normal mode. In Tilt mode, the liquid crystal display 72 degrades its transmittance to differentiate liquid crystal fragments being driven. Alternatively, the transmittance may be drastically lowered to nearly shield light to differentiate the liquid crystal fragments being driven.

The transmission area 70a shaped like a band rising rightward in the center of the field frame 70 transmits light all the time. The distance measurement circle 71 is located in the center of the transmission area 70a.

Next, the operations of the camera of the second embodiment having the aforesaid configuration will be described.

The camera of the second embodiment can be operated similar to that of the first embodiment. A difference between the cameras is the display in a finder when distance measurement is performed in Tilt mode.

A liquid crystal display 72 shown in FIG. 30 lights entirely. All the liquid crystal fragments are energized, and light transmission is suppressed or light is shielded. Hatched areas indicate liquid crystal fragments being driven. In the liquid crystal display 72 shown in FIG. 31, an apparent space between subjects 41 and 42 is specified after a tilt lever 108 is turned to an L2 or R2 position and held there. Similar to FIG. 30, hatched areas indicate liquid crystal fragments being driven. In the liquid crystal display 72 shown in FIG. 32, an operation has terminated after the tilt lever 108 was turned to the L1 or R1 position and held there. Similar to FIGS. 30 and 31, a hatched area selectively illuminated liquid crystal fragments.

Figure 32:
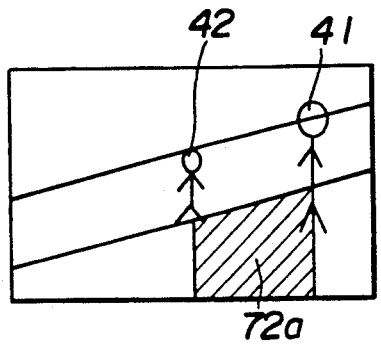
FIG. 32 is a front view showing an example of the liquid crystal display and finder field frame appearing after the width of the lighting portion of the liquid crystal display of FIG. 30 is adjusted to agree with the space between subjects within the finder field frame, then the subjects are positioned.

After the state shown in FIG. 32, the camera enters a release standby state. After the release is complete, the camera operates similar to that of the first embodiment.

Using the camera of the second embodiment having a built-in tilt mechanism that is configured as mentioned above, since a subject specifying means is installed within a field frame and located in a photographic field, a photographer need not be conscious of the outside of the photographic field area but can specify a subject effortlessly. Compared with the first embodiment in which a specifying means is installed outside the field frame, the specifying means can be increased in size. This results in improved precision in subject specification.

Next, a distance measurement error or an error occurring in setting a finder that is predictable in operating the camera of the first or second embodiment of the present invention and must be corrected will be described.

Figure 34:
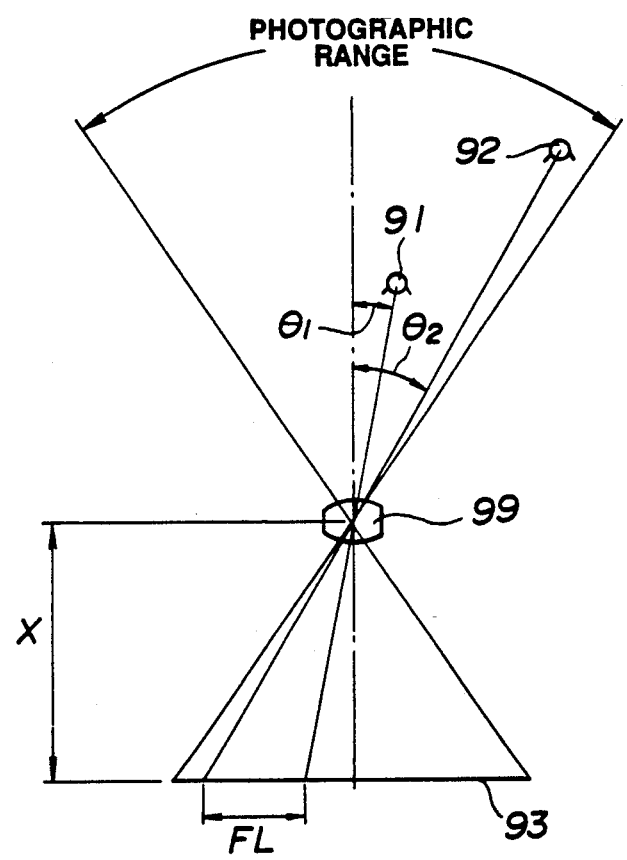
FIG. 34 shows an example of a model representing an apparent field of view a finder produces as an equivalent image surface.
Figure 35:
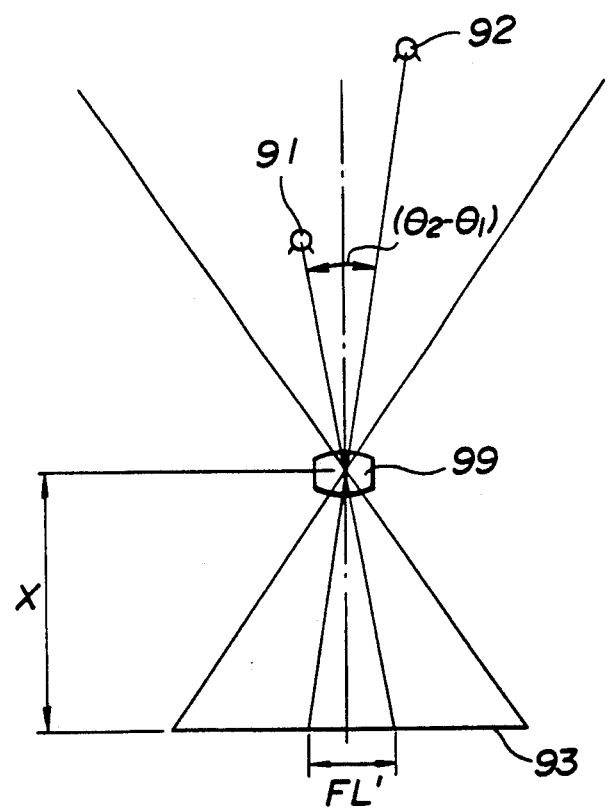
FIG. 35 shows another example of a model representing an apparent field of view a finder shows as an equivalent image surface.

FIGS. 34 and 35 show models representing apparent fields of view a finder shows as equivalent image surfaces.

When a tilt lever 108 is turned to an R2 or L2 position in order to set an apparent space between subjects, if a photographic scene is as shown in FIG. 34, framing is performed to attain a composition shown in FIG. 35 as described previously.

However, an apparent space FL between subjects 91 and 92 appearing in a finder shown in FIG. 34 is represented as the expression below, $$FL = x(\tan \theta 2 - \tan \theta 1)$$

while an apparent space FL' shown in FIG. 35 is provided as the expression below.

$$FL' \approx 2 \times x \cdot \tan\{(\theta 2 - \theta 1)/2\}$$

Herein, FL is not equal to FL'.

Figure 23:
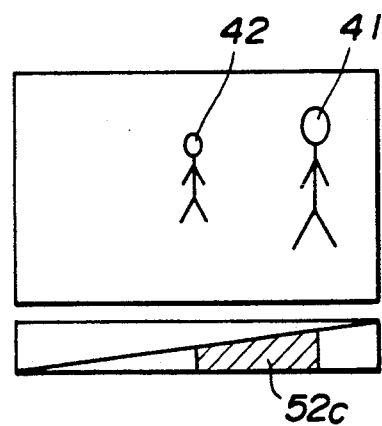
FIG. 23 is a front view showing an example of the liquid crystal display and finder field frame appearing after the width of the lighting portion of the liquid crystal display is adjusted to agree with the space between subjects within the finder field frame and the subjects are positioned.
Figure 24:
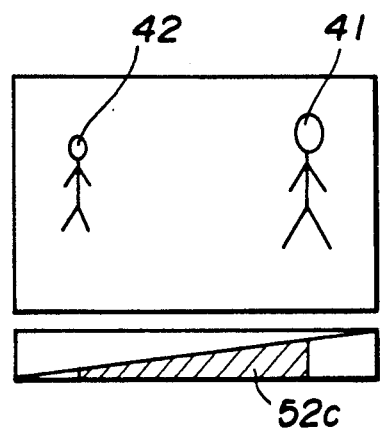
FIG. 24 is a front view showing other example of the liquid crystal display and finder field frame appearing after the width of the lighting portion of the liquid crystal display is adjusted to agree with the space between subjects within the finder field frame and the subjects are positioned.

Therefore, even if an attempt is made to locate the subjects 91 and 92 by turning the tilt lever 108 to the R1 or L1 position, the apparent space set using the tilt lever 108 does not agree with the real space so precisely as that achieved in FIG. 23.

However, in the camera of this embodiment, a photographic lens 99 is a single-focus lens having a focal distance f of 35 mm. An angle of field on one part of the longitudinal side of the photographic lens 99 is about 27 degrees.

In FIG. 34, assuming that $\theta 1$ is 15 degrees and $\theta 2$ is 25 degrees, the expression below is established.

$$FL'/FL = 0.88$$

Under a condition that one of the subjects resides somewhere around the periphery of a screen, an error is about 10%.

When higher accuracy is required, the error of about 10% must be corrected. As far as a normal photographic optical system is concerned, the error is absorbed in a subject field depth and does not pose a problem.

Figure 36:
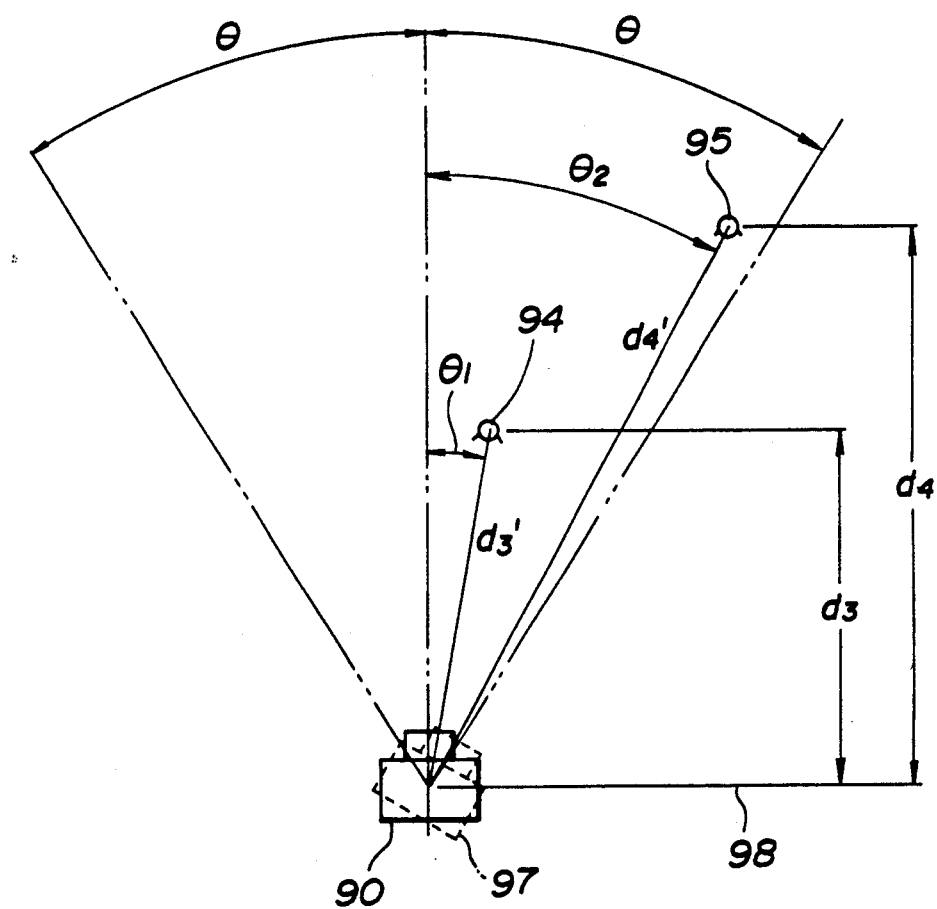
FIG. 36 shows the positional relationships of subjects to a camera during photography to explain a factor leading to a distance measurement error.
Figure 37:
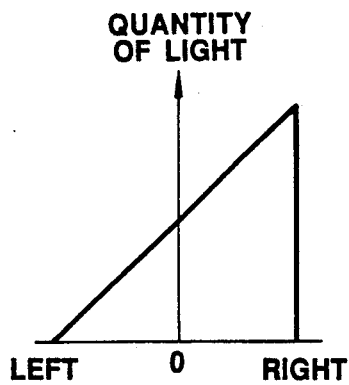
FIG. 37 shows a lighting characteristic of a flashtube in a variable lighting strobe employed for the third embodiment of the present invention.
Figure 38:
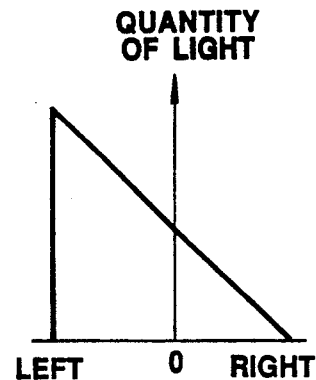
FIG. 38 shows a lighting characteristic of a flashtube in a variable lighting strobe employed for the third embodiment.
Figure 39:
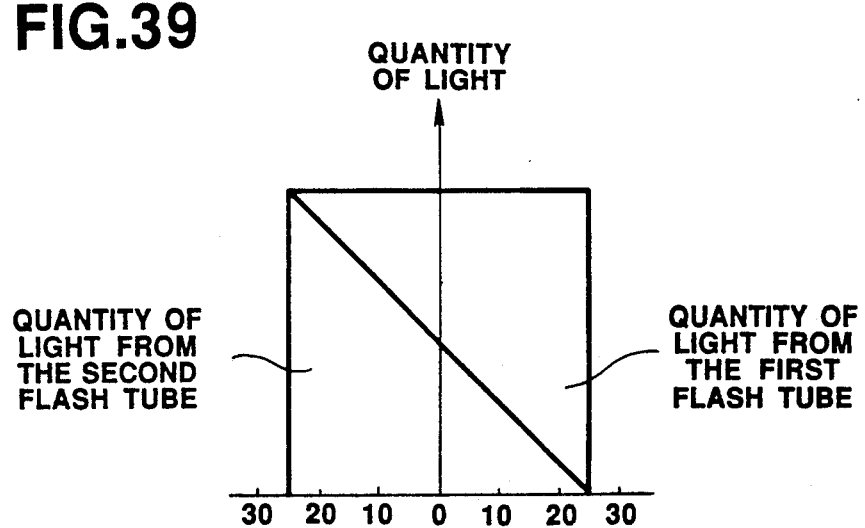
FIG. 39 shows a synthetic lighting characteristic available when flashtubes having the characteristics of FIGS. 37 and 38 are energized to produce full flashes of light of the same quantity.

FIG. 36 is an explanatory diagram for explaining a factor of a distance measurement error, which shows the relationships of subjects to a camera during photography.

Subjects 94 and 95 are separated from an equivalent image formation plane 98 of a camera 90 by distance d3 and d4. A camera 97 indicated with a dashed line represents the camera 90 that has been swung for measuring distances d3 and d4 or for setting an apparent intra-subject space due to turning a tilt lever 108 to an R2 or L2 position. The distance measurement is, needless to say, achieved using swing angles specified with the optical axis swung to coincide with the subjects.

Assuming that, similar to the model of FIG. 34, half a photographic angle is 27 degrees, $\theta 1$ is 15 degrees, and $\theta 2$ is 25 degrees, measured values d3' and d4' are represented relative to the actual distances d3 and d4 as follows:

$$d3' = d3/\cos \theta 1$$

$$d4' = d4/\cos \theta 2$$

Therefore, since $\theta 1$ is 15 degrees and $\theta 2$ is 25 degrees, $$d3' = 1.03 \times d3$$

$$d4' = 1.10 \times d4$$

Thus, d3' and d4' contain errors of 3% and 10%.

However, these degrees of errors are, similar to the aforesaid error occurring in setting a finder, absorbed in subject field depths and do not pose any problem. These errors occur commonly among all cameras having existing focus locking mechanisms.

Next, the third embodiment of the present invention will be described.

In a camera of the third embodiment, distances to two main subjects in a photographic screen are measured sequentially using a single-point distance measuring means. These two sets of distance measurement information are used to specify positional relationships; that is, in what direction in the screen the two subjects reside and by what distance the subjects are separated. Then, the specified data is entered. Thereby, a variable lighting strobe flashes light of an adequate quantity to the two main subjects accurately. Then, photography is accomplished.

Figure 40:
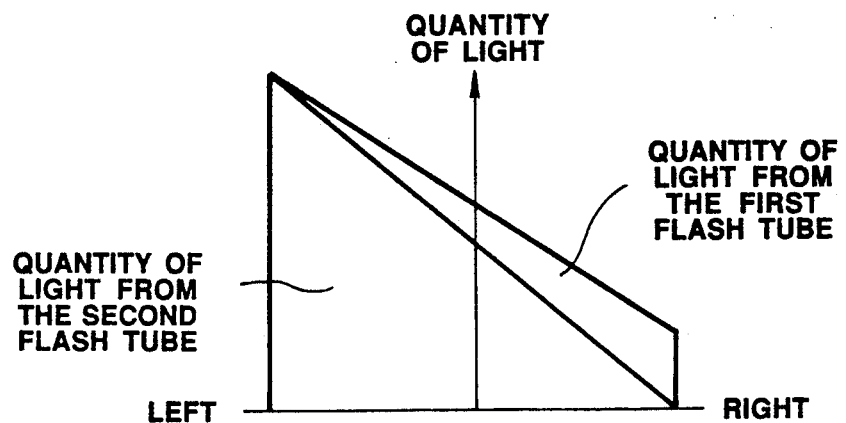
FIG. 40 shows a synthetic lighting characteristic available when flashtubes having the characteristics of FIGS. 37 and 38 are used and the quantity of light the first flashtube produces is varied.

The lighting characteristic of the variable lighting strobe will be described specifically in conjunction with FIGS. 37 to 40. Two flashing units have dissimilar lighting patterns shown in FIGS. 37 and 38 which are substantially symmetrical with respect to the axis. When the flashtubes are energized to produce full flashes containing the same quantity of light, a synthetic lighting pattern shown in FIG. 39 results. Then, the quantities of light of the flashing units are controlled according to the distance measurement information. Thus, lighting variation is achieved as shown in FIG. 40.

Figure 41:
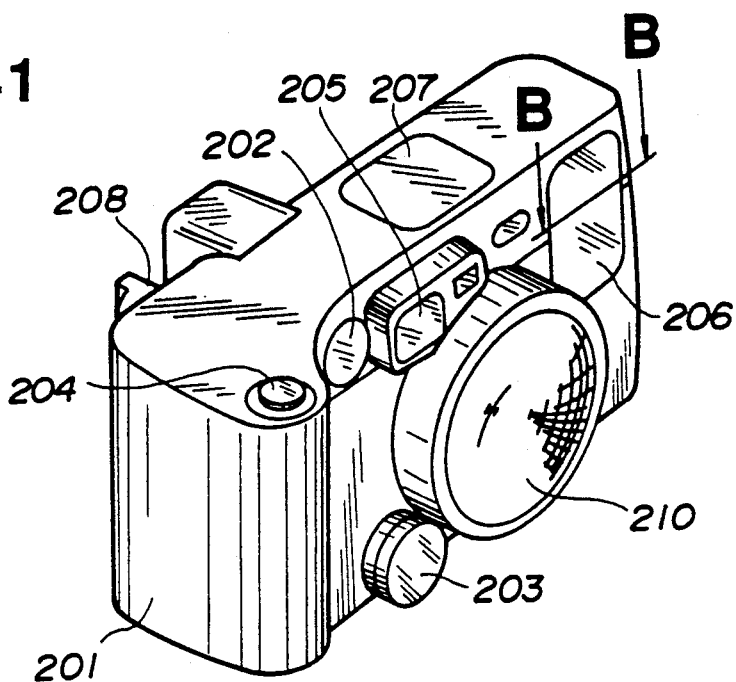
FIG. 41 is an oblique view showing the appearance of the camera of the third embodiment of the present invention.
Figure 48:
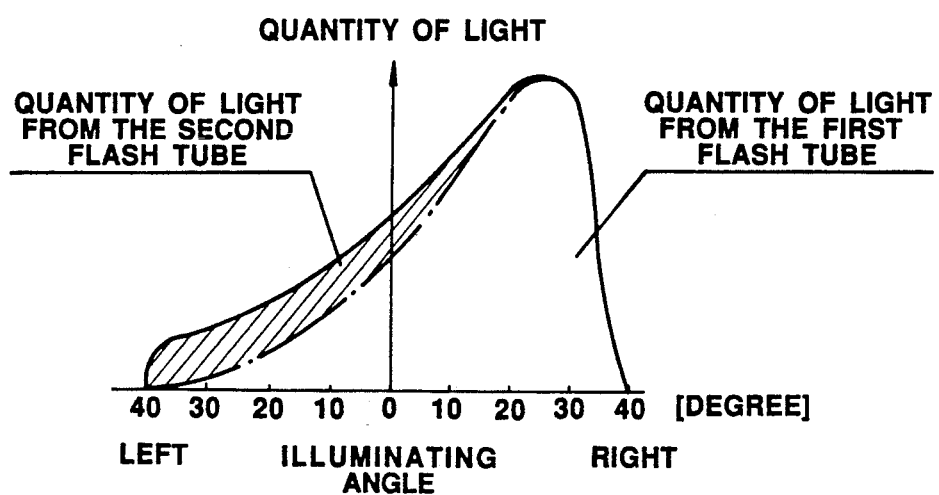
FIG. 48 shows a lighting characteristic available when a ratio between quantities of light shown in FIG. 47 is varied.
Figure 49:
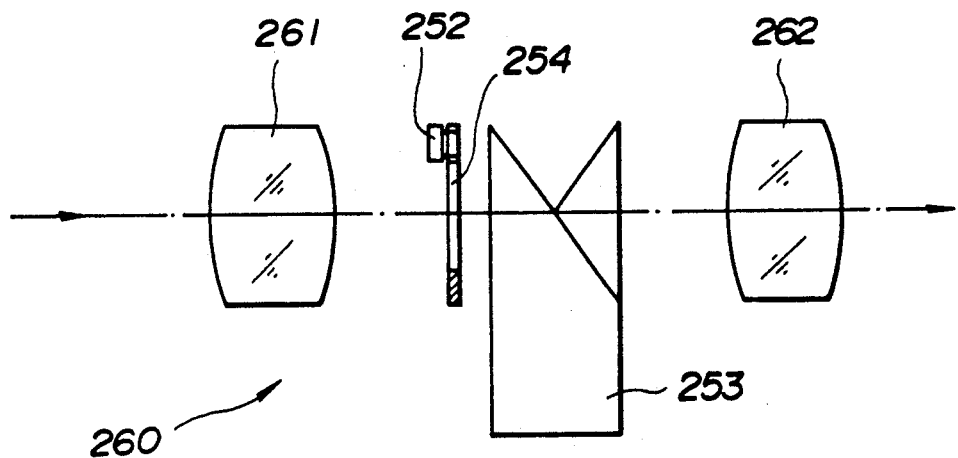
FIG. 49 is a layout of a finder optical system in FIG. 50.
Figure 50:
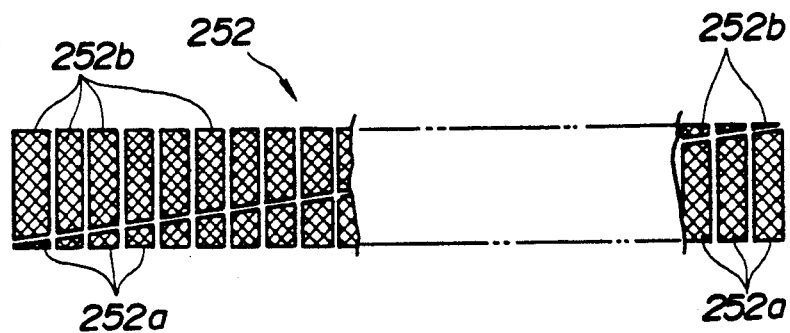
FIG. 50 is an enlarged front view of the liquid crystal display of FIG. 49.

FIG. 41 is an oblique view showing an appearance of a camera of the third embodiment of the present invention. On the front of a camera body 201, a single-focus lens 210 with a focal distance 35 mm is substantially in the center of the camera, and a known single-point distance measurement type active AF projector 202 and light receiver 203 are located in the upper left and lower left of the singe-focus lens 210. Furthermore, a real-image type finder 205, to be described in conjunction with FIGS. 49 and 50, is located in the upper left area, and a strobe 206, to be described in conjunction with FIGS. 43 to 48, is located in the upper right end of the camera body. On the top of the camera body 201, a release button 204 to be pressed in two steps is formed in the left front, and a display 207 or a liquid crystal display for setting various mode and displaying the number of frames is formed in the top center of the camera body. On the back of the camera body 201, an operation lever 208 for manipulating the display 207 is formed.

Figure 42:
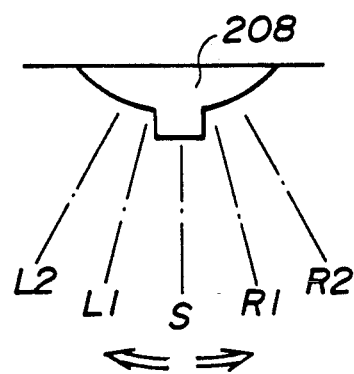
FIG. 42 is a top view showing set positions of an operation lever shown in FIG. 41.

The lever 208 can be moved laterally with a right thumb. FIG. 42 is a top view of the lever 208. In FIG. 42, the center S indicates an initial position of the lever. The lever is constructed to be turned to right positions R1 and R2, and left positions L1 and L2. Thus, the lever can stop at a total of five positions. Operations associated with the positions will be described later.

Photography using this camera is achieved using a release button 204. The release button 204 is controlled by two-step pressing. An operation activated by pressing the button to the first step is referred to as the first release, and an operation activated by pressing the button to the second step, as the second release.

Figure 43:
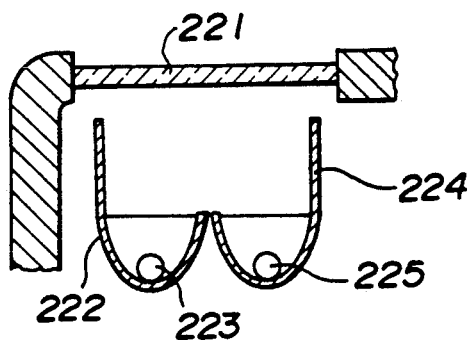
FIG. 43 shows a looking in the direction of arrows B—B cross section of a strobe in FIG. 41.

FIG. 43 shows a B—B cross section of a strobe 206 shown in FIG. 41. The strobe 206 is a double-flash type flashing means. 223 and 225 denote first and second flashtubes. 222 and 224 denote reflectors attached to the flashtubes. The reflectors 222 and 224 are made of general by bright aluminum plates. The internal surfaces of the reflectors 222 and 224 are formed with planes having a reflectance of 90% or higher.

Figure 44:
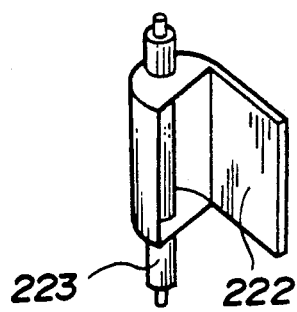
FIG. 44 is an oblique view showing one flashtube in FIG. 43.

The first and second flashtubes 223 and 225 are energized with high voltages that are applied across them by a member that is not shown. For more accurate understanding of their shapes, FIG. 44 provides an oblique view of one of the flashtubes. As illustrated, the reflector 222 has a disparate structure; that is, one of the ends of the reflector 222 is projecting forward from an area near a substantially elliptic flashtube. The projecting portion has, needless to say, a bright surface.

Figure 45:
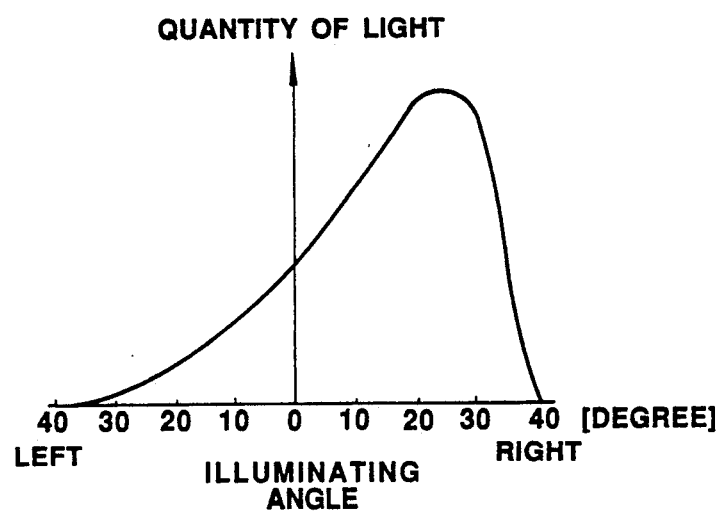
FIG. 45 shows a lighting characteristic available when the first flashtube in FIG. 43 is energized to produce a full flash of light.

Lighting patterns of the strobe will be described in conjunction with FIGS. 45 to 48. FIG. 45 shows a lighting characteristic in the lateral direction of the camera available when the first flashtube 223 shown in FIG. 43 is energized to flash light of a full quantity. The lateral direction means the right and left of a photographer who is viewing subjects through a camera. As distinctly seen in FIG. 45, the flash the first flashtube 223 produces shows such a lighting pattern that lighting is deflected to the right.

Figure 46:
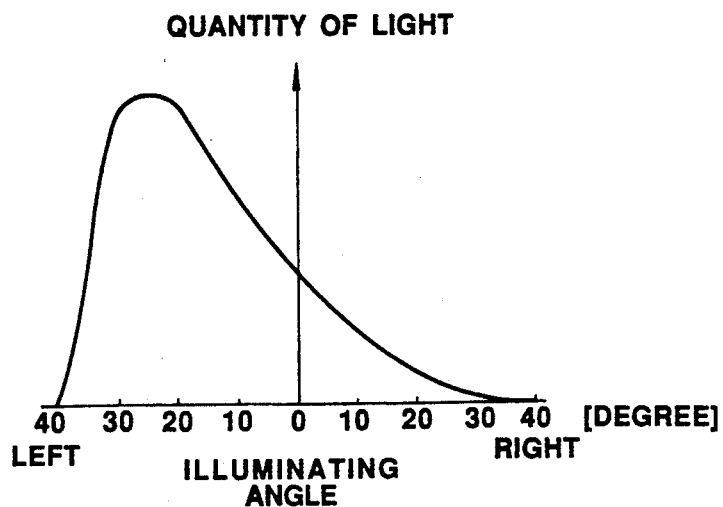
FIG. 46 shows a lighting characteristic available when the second flashtube in FIG. 43 is energized to produce a full flash of light.

FIG. 46 shows a lighting characteristic available when the second flashtube 225 is energized to flash a full quantity of light. The lighting is deflected to the left. The lighting patterns shown in FIGS. 45 and 46 are substantially symmetrical to the optical axis.

Figure 47:
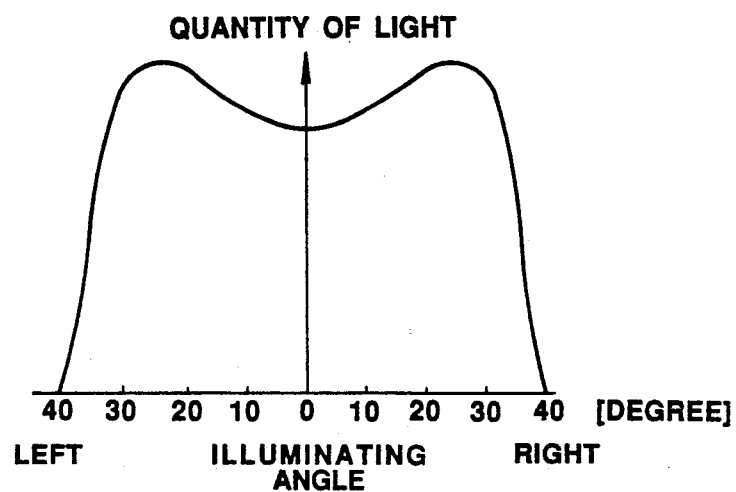
FIG. 47 shows a lighting characteristic in which the lighting characteristics of FIGS. 45 and 46 are overlapped.

FIG. 47 shows a lighting pattern in which the lighting patterns of FIGS. 45 and 46 are overlapping. As shown in FIG. 47, when the flashtubes 223 and 225 are energized to produce full flashes, a total lighting pattern results in a symmetrical pattern having a concave center. When a ratio between quantities of light of the first and second flashtubes 223 and 225 is varied, lighting patterns are obtained showing various deflections; such as the ones of FIG. 48 are made available.

Next, a finder optical system 260 in a camera body 201 shown in FIG. 41 will be described in conjunction with FIG. 49.

FIG. 49 schematizes the finder optical system 260. The finder optical system 260 comprises an objective 261, a Porro prism 253, and an eyepiece 262. 254 denotes a field mask whose plane serves as an image formation plane. A display is arranged so that it can be visible in the lower part of a field of view appearing in the finder. The display is a liquid crystal display 252 located in a notch of a mask 254 shown in FIG. 49.

The liquid crystal display 252 is connected to a liquid crystal drive via a member that is not shown, and thus driven by the liquid crystal drive. The liquid crystal display 252 is, as seen in the enlarged view of FIG. 50, divided into multi-segmented portions 252a and 252b. The portions 252a and 252b are controlled independently.

Figure 51:
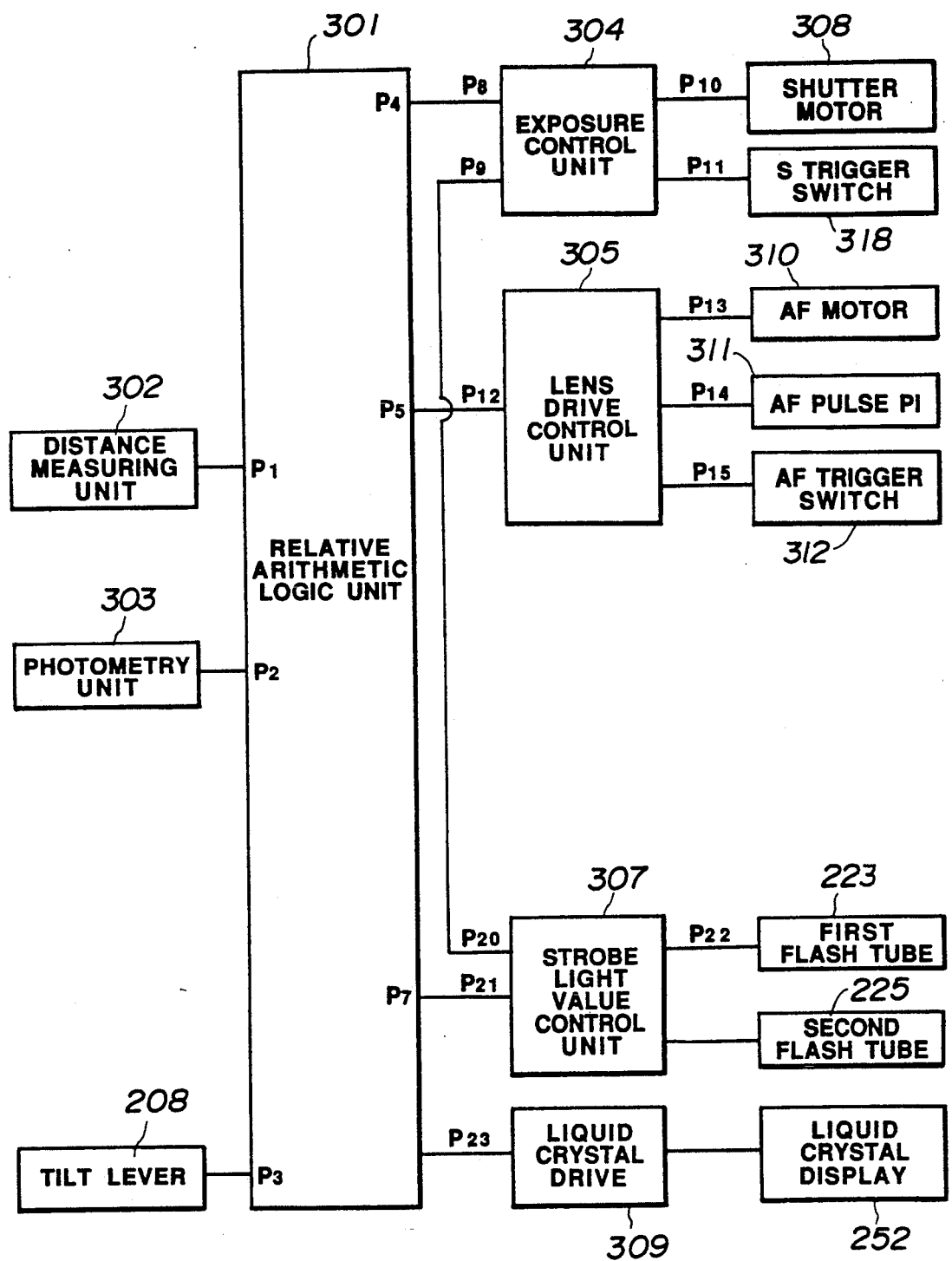
FIG. 51 is a block diagram showing an electrical circuitry of a camera of the third embodiment of the present invention.

FIG. 51 is a block diagram showing a main section of an electric circuitry of the camera. With release, a distance measuring unit 302 serving as a distance measuring means operates. Information from a photometry unit 303 is supplied to a relative arithmetic logic unit 301 serving as a storing means, a specifying means, and an arithmetic logic means. When an operation lever 208 is manipulated, a liquid crystal display 252 changes its states. A photographic operation is controlled based on a set liquid crystal, and distance measurement and photometric data.

Herein, the photographic operation is a generic term relating to operations for controlling sections below.

[1] A section responsible for opening and closing a shutter, wherein a shutter motor 308 and an S trigger switch 318 are controlled by an exposure control unit 304 connected to the shutter motor 308 and S trigger switch 318.

[2] A section responsible for focusing, wherein an AF motor 310, an AF pulse PI 311, and an AF trigger switch 312 are controlled by a lens drive control unit 305 connected to the AF motor 310, AF pulse PI 311, and AF trigger switch 312.

[3] A section in which a first flashtube 223 and a second flashtube 225 serving as a flashing device for illuminating subjects when brightness is low are controlled by a strobe light value control unit 307 connected to the first flashtube 223 and second flashtube 225.

[4] A section in which a liquid crystal display 252 serving as a displaying means that is manipulated using the operation lever 208 and displays a lighting pattern on a monitor is controlled by a liquid crystal drive 309 connected to the liquid crystal display 252.

Figure 52:
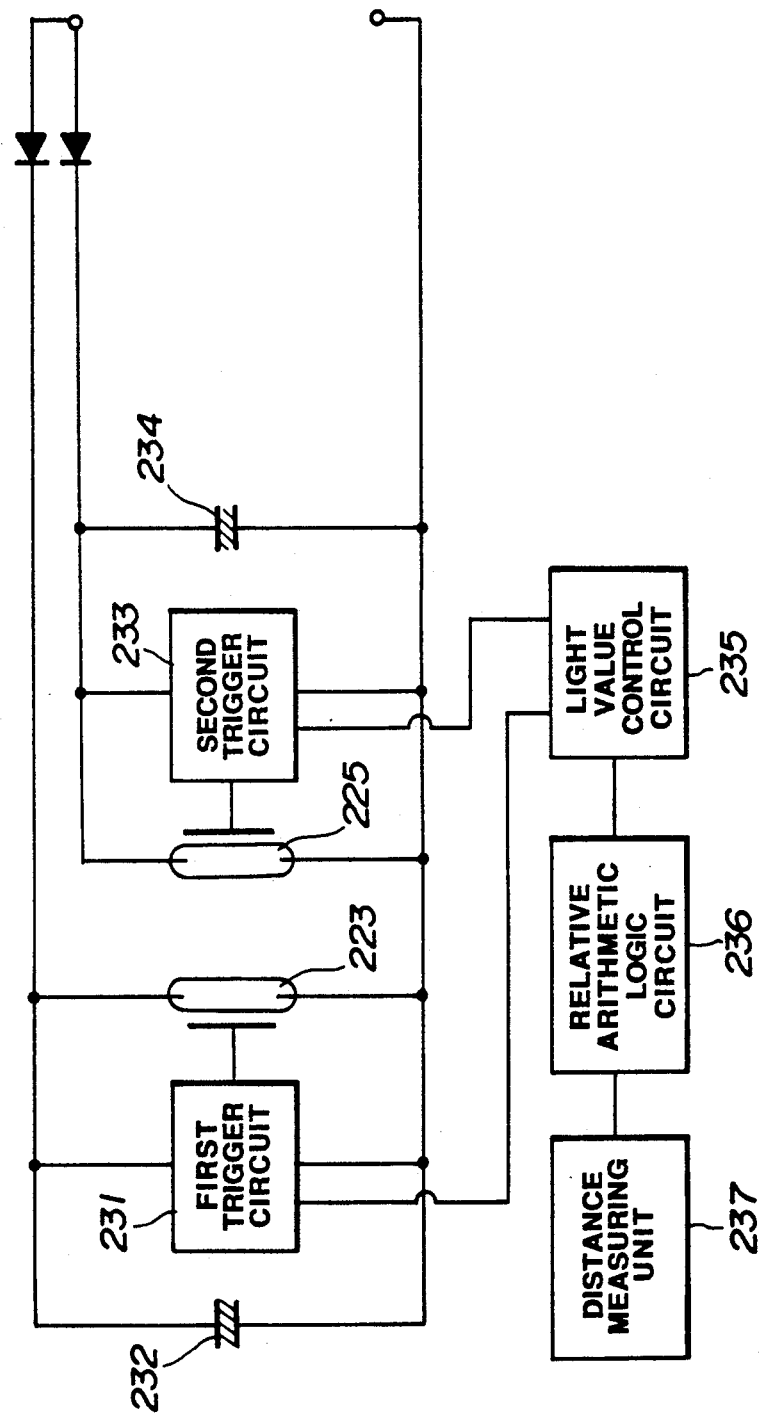
FIG. 52 is a block diagram showing a detailed configuration of a flashing device made up of first and second flashtubes and a strobe light value control unit shown in FIG. 51.

FIG. 52 is a block diagram detailing the configuration of a flashing device made up of a first flashtube 223, a second flashtube 225, and a strobe light value control unit 307, which are shown in FIG. 51. The first flashtube 223 is connected with a first trigger circuit 231 having a flashing trigger transformer (not shown for simplicity) and a first main capacitor 232 for storing flashing energy. The second flashing device 225 is connected with a second trigger circuit 233 and a second main capacitor 234, similar to the first flashtube 223.

The trigger circuits 231 and 233 are connected to a light value control circuit 235 for controlling quantities of light the flashtubes 223 and 225 produce. The circuit 235 is connected to a distance measuring unit 237 for measuring distances to multiple places in a photographic screen, and to a relative arithmetic logic circuit 236 serving as a flashlight value computing means for computing quantities of flashlight of the two flashtubes 223 and 225 for each of the distances to the multiple places.

Figure 53:
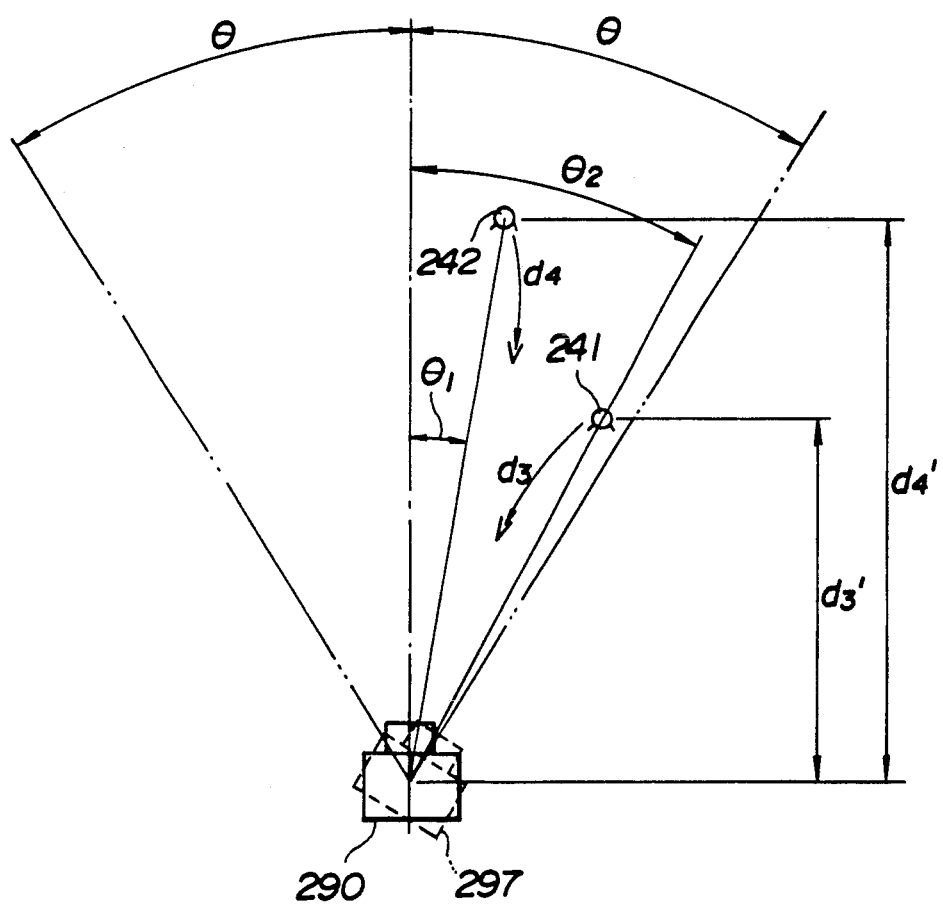
FIG. 53 is a top view showing a camera and subjects in a situation in which a photographer actually operates a camera to expose the subjects to light.

Operations for photography to be done under the aforesaid configuration will be described below. Prior to the description, the principles of variable lighting computation implemented in this camera will be described. FIG. 53 is a top view of a camera and subjects when a photographer actually uses a camera 290 to expose the subjects to light. An angle of the right or left of the center axis indicates a photographic range in the longitudinal direction of the screen. Main subjects (persons) reside at positions 241 and 242.

The near person 241 is separated from the camera by a distance d3', and the remote person 242, by a distance d4'. If the distances are identified, quantities of light required for the subjects can be calculated. However, when only distance information is available, the locations of the subjects in the screen are unclear. Even if lighting can be inclined according to the principles described previously, an optimal lighting pattern cannot be analogized.

Therefore, in FIG. 53, if the positions of subjects in the screen or angles $\theta1$ and $\theta2$ are identified, four sets of information; d3' and d4', and $\theta1$ and $\theta2$, and predetermined variable lighting information permits more adequate lighting control. Thus, the main object of this embodiment is to provide a camera that has a simple configuration, and still inputs necessary distance and angle information, and achieves lighting optimally.

Figure 54:
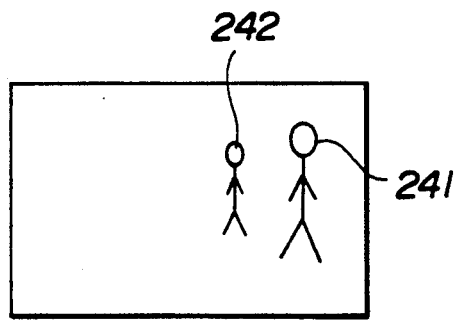
FIG. 54 shows a photographic result the photographer wants under the situation shown in FIG. 53.

Assume that a photographer wants a photograph shown in FIG. 54 in the situation shown in FIG. 53.

Figure 55:
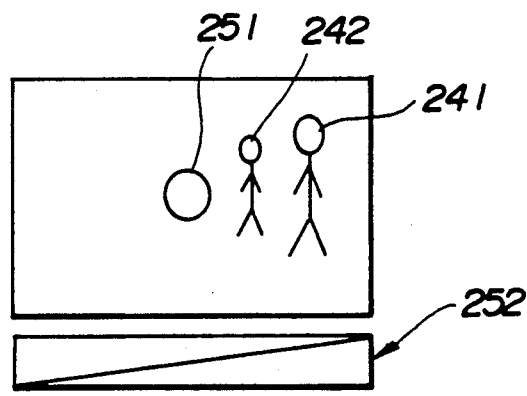
FIG. 55 shows a finder field of FIG. 54.

FIG. 55 shows a photographic scene recognized through a finder. This camera is of the type that measures a distance to a single point in the center of a field of view. Therefore, a distance measurement circle 251 is formed in the center. A liquid crystal display described in conjunction with FIG. 50 is formed in the lower part of the field of view. In an initial state of photography, all segments of the liquid crystal display are put out. In this state, neither of the main subjects (two persons) reside in the center as shown in FIG. 53. Therefore, if a photographer proceeds with release to complete the second release, the focus is set at a too rear position. The resultant photograph is out of focus. This reasoning is identical to that in an existing camera.

Then, in this embodiment, when a variable lighting mode is specified, first, the first release is performed to lock the focus. Then, distance information is acquired. In this case, as described in conjunction with FIG. 53, distances to two main subjects are needed for variable lighting. Therefore, when the variable lighting mode is employed, the first release must be repeated twice.

The concept is explained using a camera 297 indicated with a dashed line in FIG. 53. The camera is swung so that the photographic optical axis will coincide with a subject 241. Next, the camera is oriented toward a subject 242. Then, the first release is carried out at each orientation.

Figure 56:
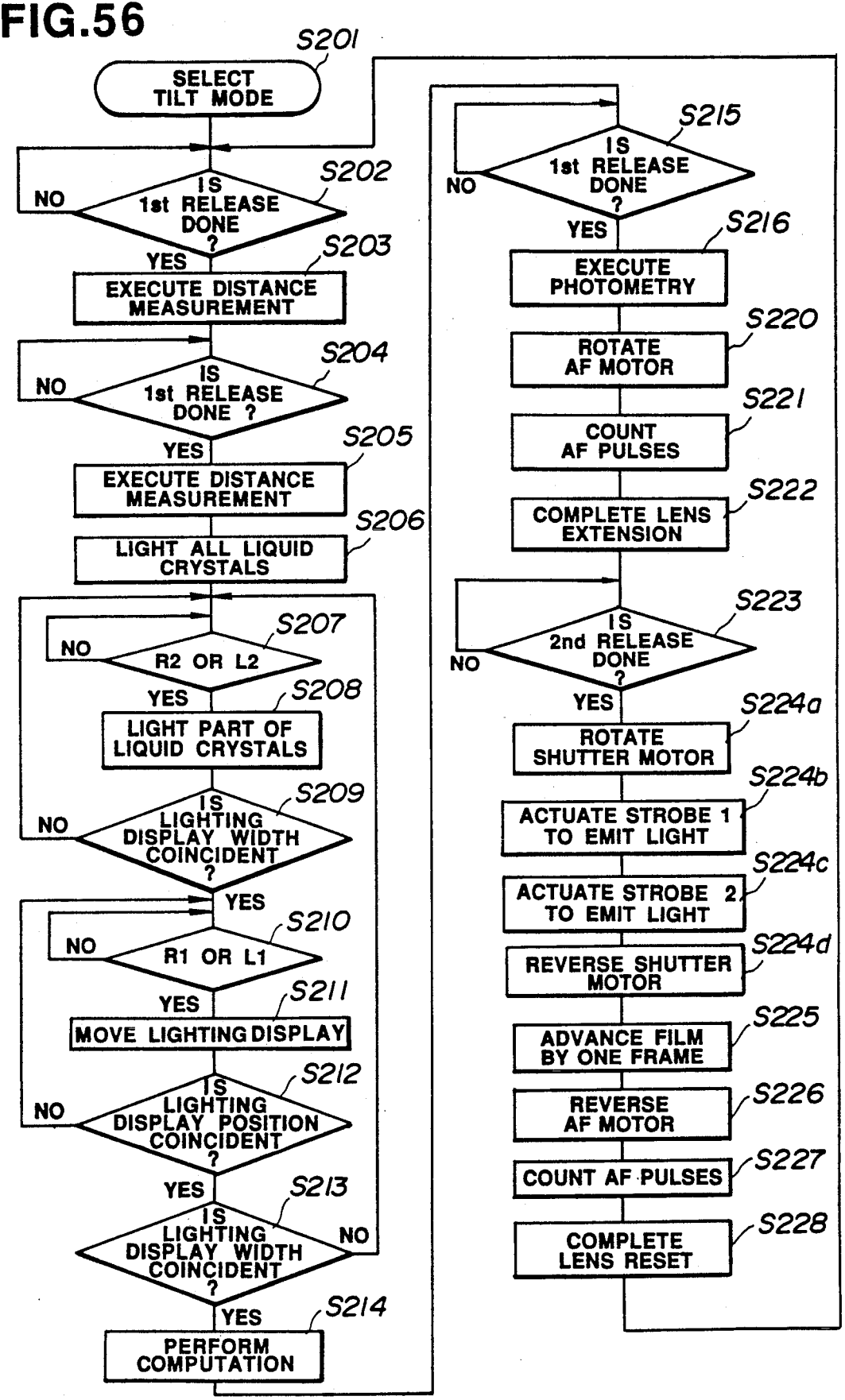
FIG. 56 is a flowchart showing the operations of the third embodiment.

FIG. 56 is a flowchart of operations for the variable lighting mode. The foregoing distance measurement is performed twice at steps S202 and S203, and steps S204 and S205. Prior to the steps S202 and S204, the photographic optical axis has been adjusted to coincide with each of the subjects.

A distance measurement error occurring at this stage will be described briefly. In FIG. 53, an image of a person 241 is formed on a plane at a distance d3' from an image formation plane of a camera for photography, and an image of a person 242, on a plane at a distance d4' from the image formation plane. However, distances measured by the aforesaid distance measurement are minimum distances; d3 and d4, which are different from d3' and d4'.

A photographic lens in this embodiment has a focal distance f of 35 mm as described previously. Therefore, half a photographic angle $\theta$ is 27 degrees. In FIG. 53, it has been assumed that $\theta1$ is 15 degrees and $\theta2$ is 25 degrees. Consequently, measured distances d3 and d4 have the following relationship with focusing distances d3' and d4':

$$d3' = d3 \times \cos\theta2$$

$$d4' = d4 \times \cos\theta1$$

where, $\theta2$ is 25 degrees, and $\theta1$ is 15 degrees. Consequently, $$d3' = 0.91 \times d3$$

$$d4' = 0.97 \times d4$$

Figure 57:
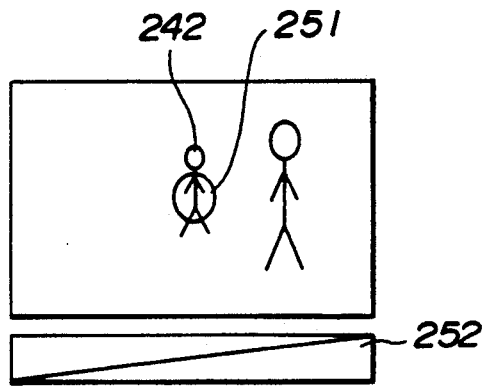
FIG. 57 shows a finder field for measuring a distance to a remote subject shown in FIG. 53.
Figure 58:
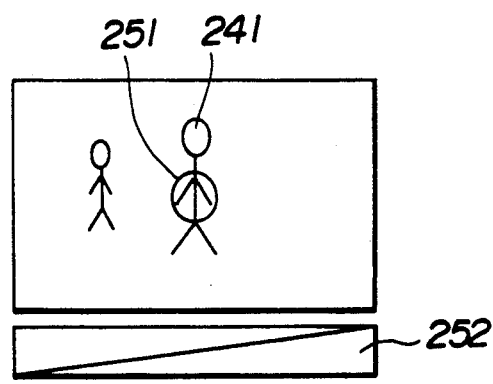
FIG. 58 shows a finder field for measuring a distance to a near subject shown in FIG. 58.

Thus, the measured distances d3 and d4 contain 9% and 3% errors respectively. However, these errors are absorbed in subject field depths set in a normal photographic optical system, and do not pose any particular problem. These errors occur commonly among automatic focusing cameras using existing focus lock mechanisms. When a photographer's field of view is discussed, a camera position 297 in FIG. 53 provides a composition of FIG. 58 for measuring a distance to a subject 241. FIG. 57 shows a composition set up at another camera position, wherein a distance to a subject 242 is measured.

As described above, two sets of distance information; d3 and d4 have been entered in a camera. However, it is a photographer who swings the camera. Therefore, $\theta1$ and $\theta2$ in FIG. 53 cannot be calculated. Then, next is an operation for entering $\theta1$ and $\theta2$ to indicate the positional relationships of d3 and d4.

Figure 59:
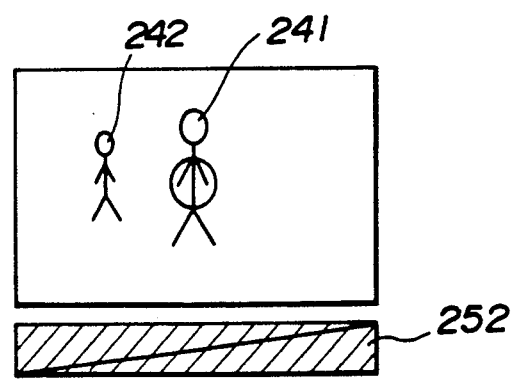
FIG. 59 shows the finder field of FIG. 58 with the liquid crystal display lit.

When measuring two distances has terminated according to the flowchart of FIG. 56, all liquid crystals in a finder field light. FIG. 59 shows this state. A hatched area indicates a lighted liquid crystal display 252. This lighting display has such a density and a color that are easily discernible to a photographer.

Figure 60:
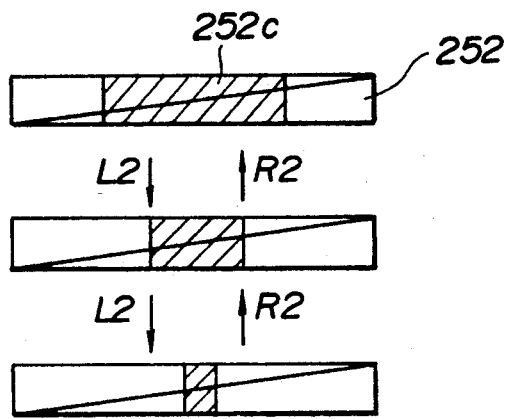
FIG. 60 shows a process of adjusting the display width of the liquid crystal display shown in FIG. 59.

Thereafter, manipulations to be described later are done using the liquid crystal display in order to set $\theta1$ and $\theta2$ The liquid crystal display can be manipulated using a lever 208 described in conjunction with FIG. 42. First, the lever 208 is turned to the second right or left position R2 or L2 in order to adjust a liquid crystal width. FIG. 60 shows the varying liquid crystal width. When the lever 208 is set at L2, the liquid crystal width reduces. At R2, the liquid crystal width increases. The lever 208 is set to R2 or L2 in order to establish an apparent angle between two subjects; $\theta2-\theta1$.

Figure 61:
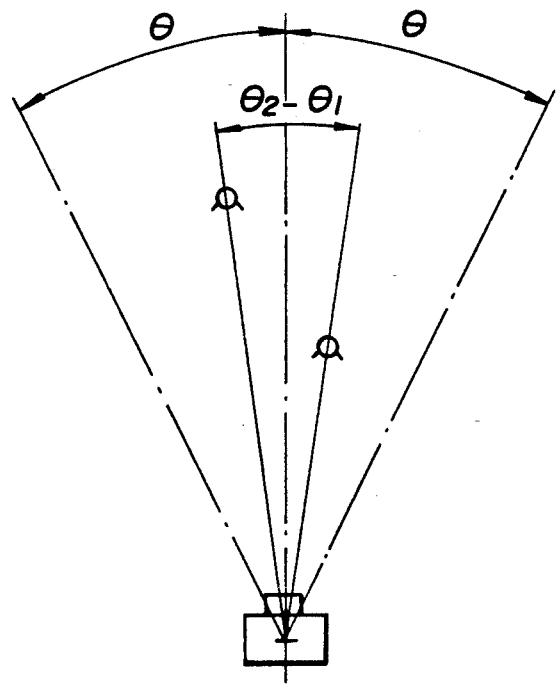
FIG. 61 is a top view for an application when a camera is swung so that the subjects shown in FIG. 53 will lie symmetrically to the center of a screen.
Figure 62:
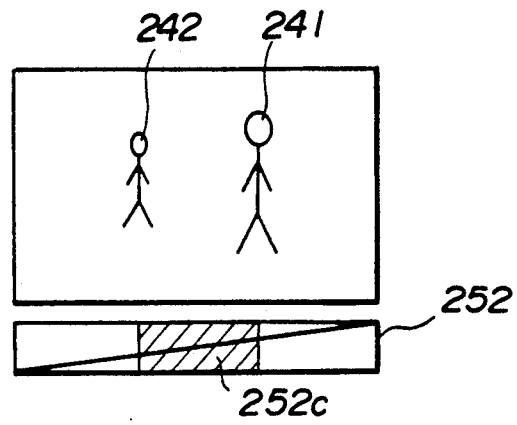
FIG. 62 shows a finder field for the situation of FIG. 61.

In FIG. 59, as described previously, all liquid crystals light. The liquid crystal width shrinks and expands relative to the center of a screen as seen in FIG. 60. As far as the composition of the screen remains unchanged from FIG. 59, the liquid crystal width cannot be adjusted to agree with an apparent width. Then, a photographer swings the camera so that the intra-subject space $\theta2-\theta1$ will be substantially symmetric to the center of the screen as shown in FIGS. 61 and 62. Thereby, the liquid crystal width comes into agreement as precisely as that of the display portion 252c in FIG. 62. In this case, as shown in the flowchart of FIG. 56, if it is found at a step S209 that the liquid crystal width disagrees with the intra-subject space, turning the lever 208 to R2 or L2 is repeated until the liquid crystal width comes into agreement.

Thus, $\theta2-\theta1$ has been established. Next, it must be specified in which area $\theta2-\theta1$ resides in the screen. The operations are carried out at a step S210 and after in FIG. 56.

Figure 63:
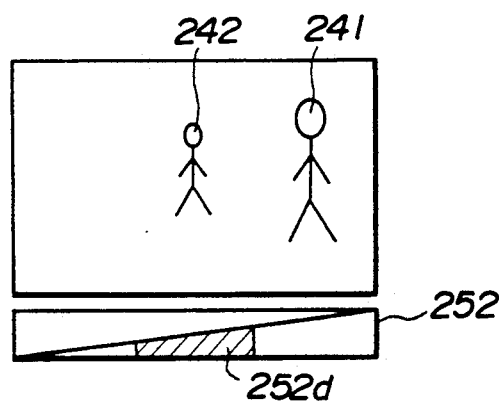
FIG. 63 shows the finder field shown in FIG. 62 after the operation lever has not been turned to R2 or L2, or L1 or R1 for some time.

When the lever 208 has not been turned to R2 or L2 for some time, or has been turned to L1 or R1, the display portion 252c in FIG. 62 gets inclined as shown in FIG. 63 (only a segment 252d of a liquid crystal 242a shown in FIG. 50 lights). When the L1 or R1 operation;

an operation activated when the lever 208 is turned to L1 or R1, is performed, the display portion moves laterally with its width constant as shown in FIG. 22. That is to say, in FIG. 63, a photographer has swung back his/her camera to take a photograph of an initially intended scene. Then, when the L1 or R1 operation is carried out, the inclined display portion will come into agreement with an intrasubject space.

Inclination of a display portion represents positional relationships of distance measurement information of two main subjects. The vertical width of a liquid crystal on the side of a near subject which apparently appears larger is made wider. That is to say, the display portions shown in FIG. 64, and FIGS. 22a, 22b, and 22f are employed when a right subject resides nearer. The display portions shown in FIGS. 22c, 22d, and 22e are employed when a left subject resides nearer.

In the flowchart of FIG. 56, if it is found at steps S212 and S213 that both the display width and position not agreeable, the display width and position can be re-set. If there is no problem, computation for variable lighting is carried out.

Required information has been entered at the steps S202 to 213. Now, it is very easy to compute quantities of light suitable for the two subjects. Prior to describing the computation, an error occurring in setting things using the liquid crystal display will be described as a supplement.

Figure 65:
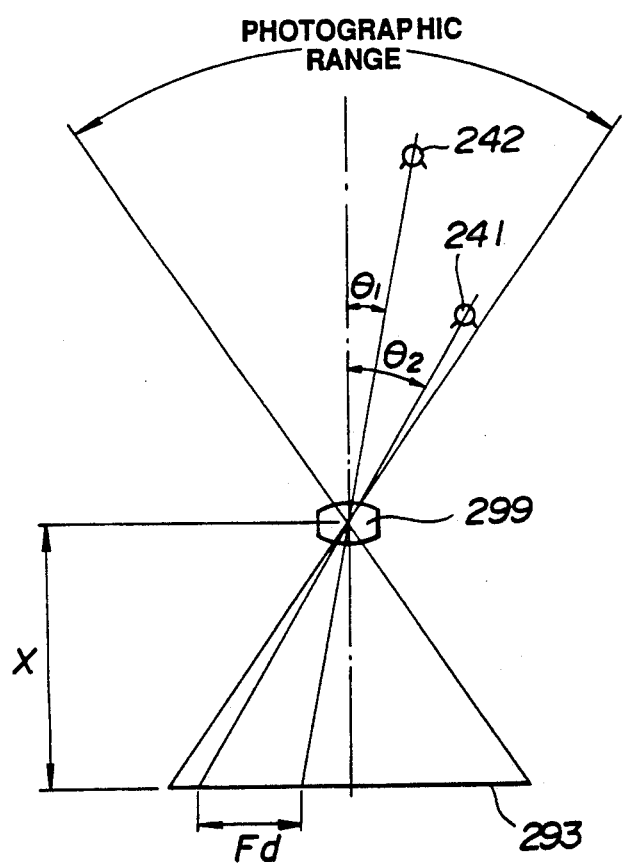
FIG. 65 shows a model of an apparent field of view a finder shows as an equivalent image surface.
Figure 66:
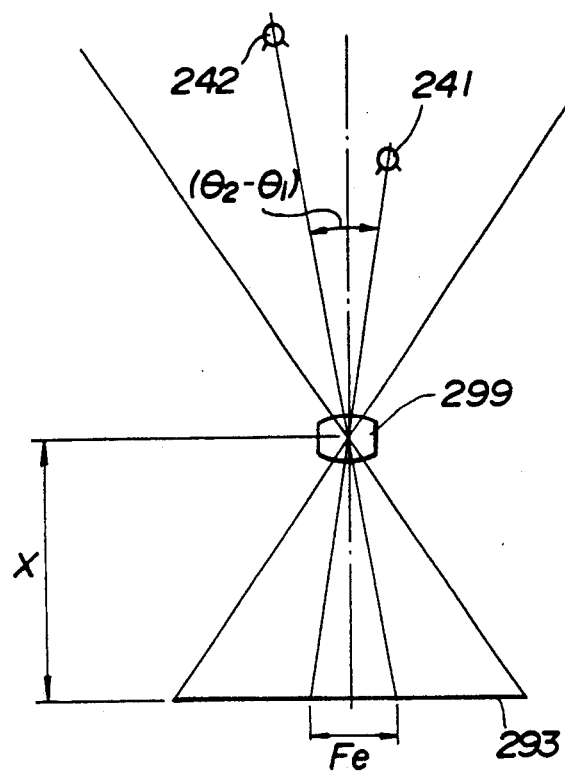
FIG. 66 shows another model of an apparent field of view a finder shows as an equivalent image surface.

FIGS. 65 and 66 show models representing apparent fields viewed through a finder as equivalent imaging planes.

When an apparent space between subjects is set by turning an operation lever 208 to an R2 or L2 position, if a photographic scene is as shown in FIG. 65, the scene is framed as shown in FIG. 66. Herein, 299 denotes an image formation optical system of a finder, and 293, an equivalent imaging plane on which a field mask lies.

In FIG. 65, an apparent space Fd between subjects 241 and 242 viewed through a finder is given as follows:

$$Fd = x(\tan\theta 2 - \tan\theta 1)$$

An apparent space Fe in FIG. 66 is represented as follows:

$$Fe \approx 2 \times x \cdot \tan\{(\theta 2 - \theta 1)/2\}$$

Therefore, Fd is not equal to Fe.

Figure 64:
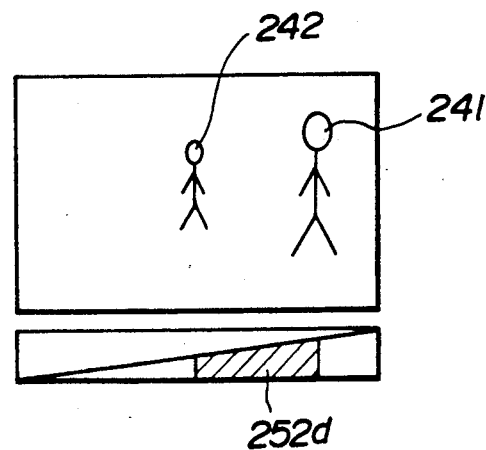
FIG. 64 shows one of the states shown in FIG. 22 during an L1 or R1 operation.

After that, even if the operation lever 208 is turned to an R1 or L1 position in an attempt to specify the positions of the subjects 241 and 242, the display portion may not agree with the space between the subjects as exactly as that shown in FIG. 64.

However, the camera of this embodiment employs a single-focus photographic lens having a focal distance f of 35 mm. An angle of view on one part of the longitudinal side of the lens is about 27 degrees. In FIG. 65, assuming the $\theta 1$ is 15 degrees and $\theta 2$ is 25 degrees, the expression below is established.

$$Fe/Fd = 0.88$$

Under a condition that one of subjects resides somewhere around the periphery of a screen, an error is about 10%.

If higher accuracy is required, the error of about 10% must be corrected. In a normal photographic optical system, the error is absorbed in a subject field depth and poses no problem.

Figure 67:
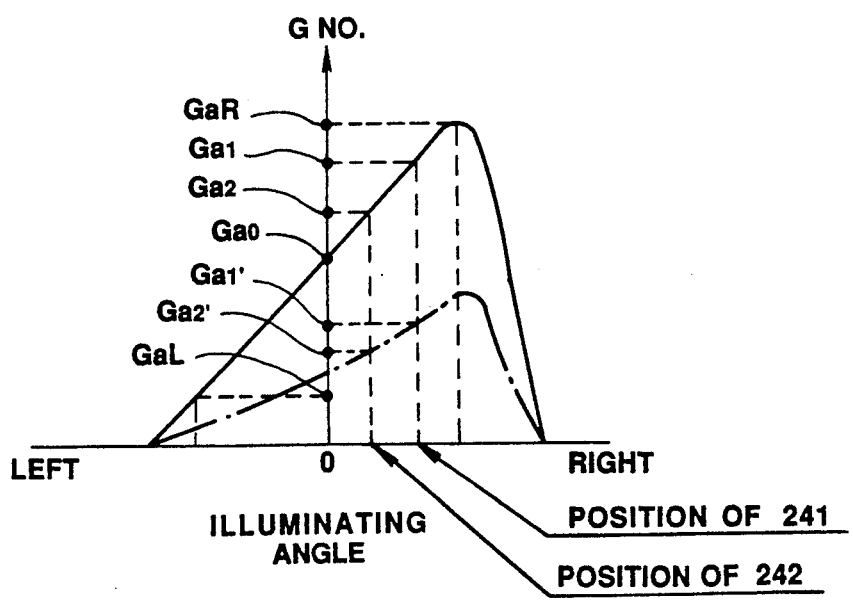
FIG. 67 plots guide numbers relative to illuminating angles of a first flashtube.
Figure 68:
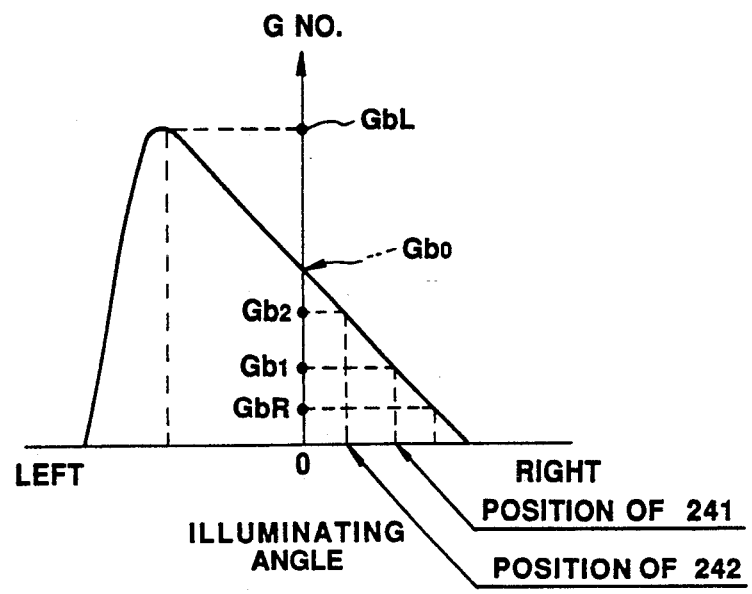
FIG. 68 plots guide numbers relative to illuminating angles of a second flashtube.

Computation of a step S214 in the flowchart of FIG. 56 will be described. When distances to subjects 241 and 242 are measured as d3 and d4 as shown in FIG. 53, computation is done as described below. First, assume that a second flashtube 225 of two flashtubes in a strobe is energized to produce a full flash, and a quality of light a first flashtube 223 produces is controlled. FIGS. 68 and 67 show lighting patterns or plot guide (G) numbers, and right and left angles of first and second flashtubes. In FIGS. 68 and 67, solid lines represent lighting characteristics for full flashing. As described previously, the lighting characteristics represent patterns substantially symmetrical to the optical axis. Since a quantity of light of the first flashtube 223 is controlled as mentioned above, the controlled lighting pattern is indicated with a dot-dash line in FIG. 67.

A guide number (hereafter, G number) is an exposure coefficient used to determine a quantity of exposure applied to a subject during full flashing. For the second flashtube 255, as shown in FIG. 68, a G number for a subject 241 is Gb1, a G number for a subject 242 is Gb2, and a G number on the optical axis is Gb0. For the first flashtube 223, as shown in FIG. 67, a G number for the subject 241 is Ga1, a G number for the subject 242 is Ga2, and a G number on the optical axis is Ga0. The first flashtube 223 whose quantity of light is controlled provides a G number of, as shown in FIG. 67, Ga1' for the subject 241, and Ga2' for the subject 242. Assuming that a parameter expressing energy fed to control the quantity of light is k (k=0 to 1), Ga1' and Ga2' are represented as the expressions below.

$$(Ga2')2 = k(Ga2)2 \qquad (2)$$

$$(Ga1')2 = k(Ga1)2 \qquad (3)$$

The quantity of light the first flashtube 223 produces is controlled so that the subject 241 at a distance d3 and the subject 242 at a distance d4 will be exposed to light of an equal quantity. Therefore, when the relational expression of the G number and f-number; G number/distance = f-number is employed, the relational expressions of the f-number 1 and f-number 2 for the subjects 241 and 242 are given as follows:

$$\{(Gb2)2 + (Ga2')2\}^{\frac{1}{2}}/d4 = \text{f-number 2} \qquad (6)$$

$$\{(Gb1)2 + (Ga1')2\}^{\frac{1}{2}}/d3 = \text{f-number 1} \qquad (7)$$

To expose the subjects to light of optimal quantities, f-number 1 of the expression (6) must be equal to f-number 2 of the expression (7). Under this condition, the energy parameter k is calculated according to the expressions (2) to (7).

Since the above computation is carried out, when only d3 and d4 are provided by executing distance measurement, lighting can be optimized.

Next, light value control to be performed when subjects are posed similarly to the aforesaid subjects 241 and 242 but an f-number is predetermined will be described. For example, when subjects reside nearby, if even a minimum diaphragm causes overexposure, light value control must be executed to control the quantity of light. Alternatively, when an F-number First mode in which a photographer can preset an f-number is designated, light value control must be executed to control the quantity of light.

In such a case, a ratio between quantities of light of first and second flashtubes 223 and 225 as well as a total quantity of energy fed to the flashtubes must be controlled. Assuming that the total energy parameter is m (m=0 to 1) and the pre-set f-number is c, the following relational expressions are established.

$$\{m \times ((Gb2)2 + (Ga2')2)\}^{\frac{1}{2}}/d4 = f\text{-number } c \quad (8)$$

$$\{m \times ((Gb1)2 + (Ga1')2)\}^{\frac{1}{2}}/d3 = f\text{-number } c \quad (9)$$

Then, using the above expressions (8) and (9) and the previous expressions (2) to (5), two parameters k and m can be calculated. Depending on the parameters k and m, the quantities of flashlight of the first and second flashtubes can be controlled. Assuming that the total energy is E, an input energy fed to the second flashtube 225 during light value control is represented as a value (mE). An input energy fed to the first flashtube 223 is represented as a value (mkE). This permits optimal exposure.

For the above computation, G numbers associated with subject positions, Ga1 and Ga2 in this example, are needed. These values are preliminarily placed in a non-volatile memory in a camera. More specifically, G numbers are recorded in association with positions of segments of liquid crystals shown in FIG. 50, and fetched by specifying positions of segments if necessary.

Alternatively, a simplified method is conceivable. That is to say, GaR, GaL, GbR, and GbL in FIGS. 67 and 68, which represent values associated with substantially ends of a photographic range, are placed in memory together with GaO and GbO values associated with the center of the photographic range. Then, G numbers for the positions of other segments are calculated by interpolating the above values stored in memory.

Figure 69:
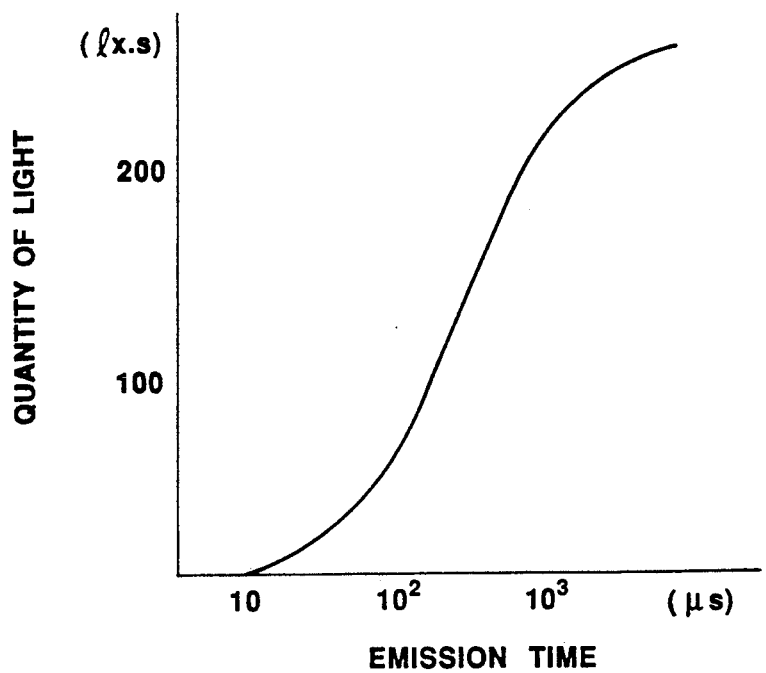
FIG. 69 plots quantities of light relative to logarithmic flashing times in a flashtube employed in this embodiment.

For satisfying a thus computed G number corresponding to the aforesaid parameters, flashing times for flashtubes are controlled so that energies associated with the aforesaid parameters will be ensured by allocating part of a total energy to flashing. However, in general, a flashing time and a required energy; that is, a flashing time and a quantity of light are not mutually proportional. FIG. 69 plots logarithmic flashing times on the x axis to represent the relationship between the flashing time and quantity of light for a flashtube employed in the camera of this embodiment. As shown in FIG. 69, the flashing time and quantity of light cannot be correlated using the foregoing simplified method.

In the camera of this embodiment, for example, a parameter k ranging from 0 to 1 is divided into 64 values. Flashing times associated with the parameter values are placed as table data in a nonvolatile memory. A flashing time t associated with a value nearest to a computed k value is fetched from the memory. Thus, an intended lighting characteristic is implemented.

Figure 70:
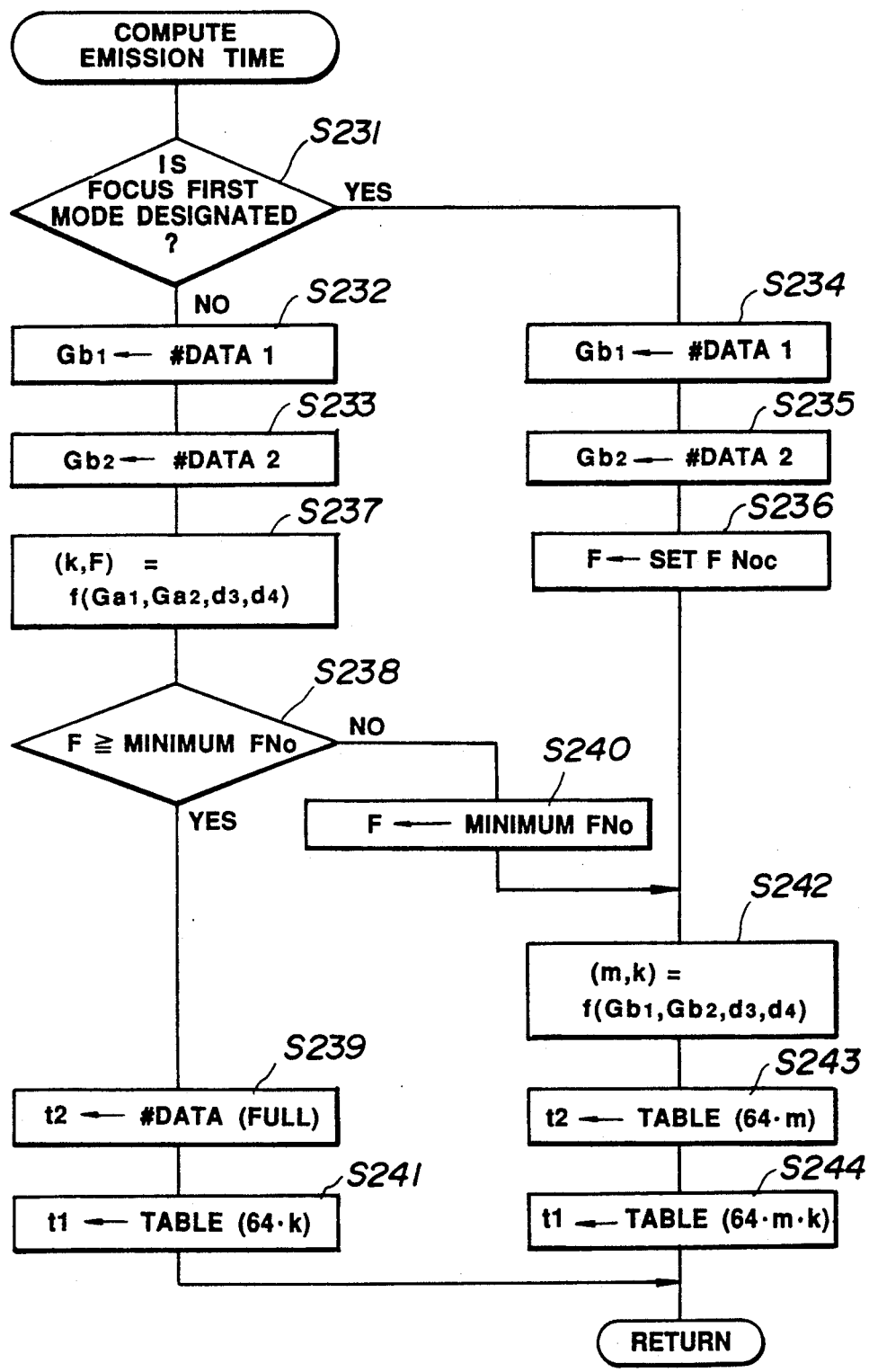
FIG. 70 is a flowchart for lighting time computation in lighting control.

The lighting time computation based on lighting control will be described in conjunction with the flowchart of FIG. 70.

At a step S231, it is determined whether an F-number First mode is selected. If not, control passes to a step S232. If the F-number First mode is selected, control jumps to a step S234.

If the F-number First mode is not designated, Data 1 and Data 2 entered at steps S232 and S233 are fetched as eigenvalues or G numbers, Gb1 and Gb2. Then, at a step S237, the Gb1 and Gb2, and distances d3 and d4 are used to calculate a parameter k, and an f-number value F according to the expressions (2) to (7). f(Ga1, Ga2, d3, d4) represents the arithmetic expression. Then, at a step S238, the f-number F is compared with a minimum f-number FNo for the camera. If the value F is not smaller than the minimum f-number FNo, control jumps to a step S239. If the value F is smaller than the minimum f-number FNo, control jumps to a step S240. At the step S240, the minimum f-number FNo is specified as the value F. Then, control passes to a step S242.

At the step S239, Data (full) of a flashing time for flashing a full quantity of light; such as, 2400 us is provided as a flashing time t2 for the second flashtube 225. Next, table data (Table 1) listing the relationships between parameters k and m, and a parameter km, and a flashing time is referenced to select a table (64 k) indicating flashing times t associated with 64 k values. Then, a flashing time t1 for the first flashtube 223 is retrieved from the table (64 k).

The table data includes flashing times t associated with 64 divided values of parameters k and m, and a parameter km.

TABLE 1

| 64 k | | | | | | |
|---|---|---|---|---|---|---|
| 64 m | | | | | | |
| 64 km | 00 | 01 | ... | 60 | 61 | 62 | 63 |
| t µs | 0 | 15 | ... | 1300 | 1400 | 1600 | 2000 |

On the other hand, if the F-number First mode is designated, existent Data 1 and Data 2 are fetched as eigenvalues or G numbers Gb1 and Gb2. The pre-set f-number FNoc is fetched as an f-number F for computation (step S236). Then, control passes to a step S242. The Gb1 and Gb2, and distances d3 and d4 are used to calculate the parameters k and m according to the expressions (2) to (5), and (8) and (9). f(F, Gb1, Gb2, d3, d4) represents the arithmetic expression.

At steps S243 and S244, the table data (Table 1) is referenced to retrieve a table 64 m listing flashing times t associated with 64 m values and a table 64 mk listing flashing times t in association with 64 mk values. Then, values specified with the calculated parameter values k and m are fetched from the table 64 m and table 64 mk, and entered as the flashing times t2 and t1 for the second and first flashtubes 225 and 223. Thus, the input energy of the strobe in the camera can be controlled.

As described above, using the camera, when distances to two main subjects are measured and the positional relationships of the subjects are specified through a finder, the subjects are illuminated according to a lighting pattern for providing quantities of light for optimal exposure. A sequence of operations after the computation is carried out at a step S215 and after in the flowchart of FIG. 56. The operations are identical to those for an existing camera except that the strobe radiates flashes sequentially.

Figure 71:
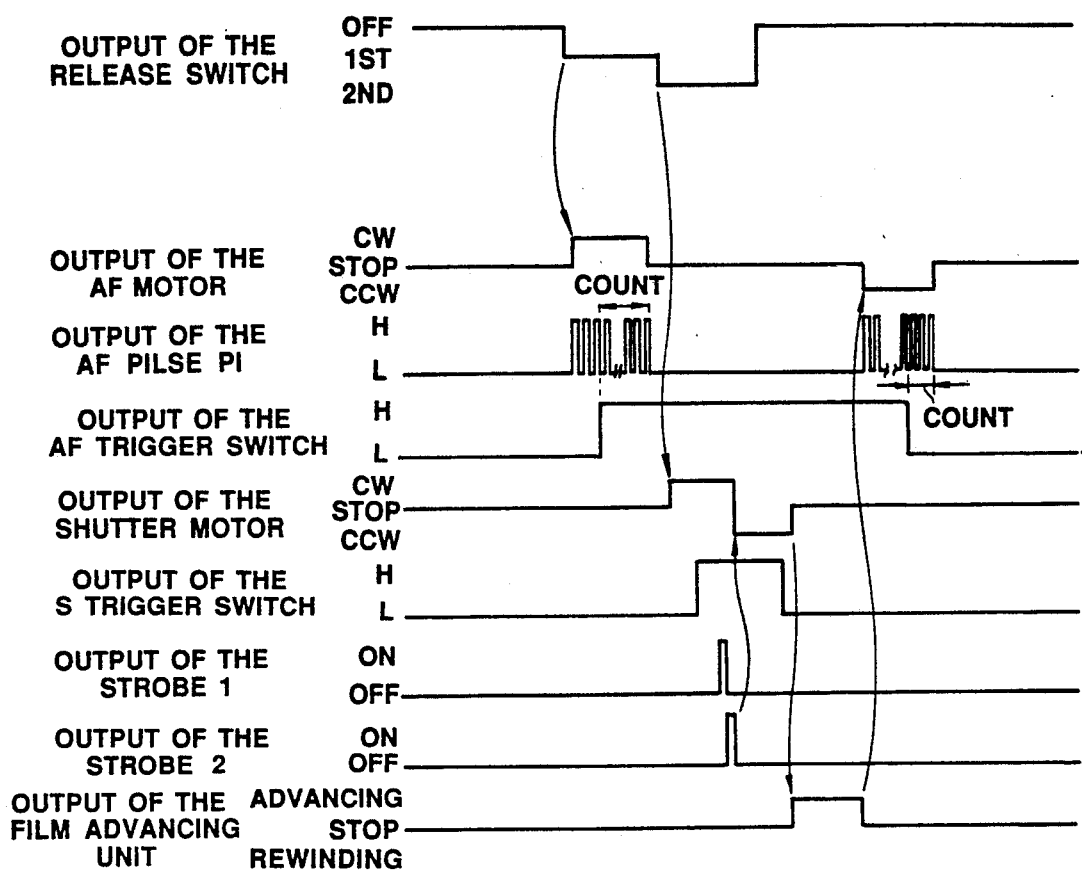
FIG. 71 is a timing chart showing the operations after a step S215 the flowchart of FIG. 56.

The operation timings at the step S215 and after will be seen in conjunction with the timing chart of FIG. 71. This will help understand the relationships among components more accurately.

Next, the fourth embodiment of the present invention will be described in conjunction with FIGS. 72 to 76. The camera of the fourth embodiment has the same components and operation as that of the third embodiment, excluding the finder optical system. Therefore, the difference or the finder optical system will be described.

Figure 72:
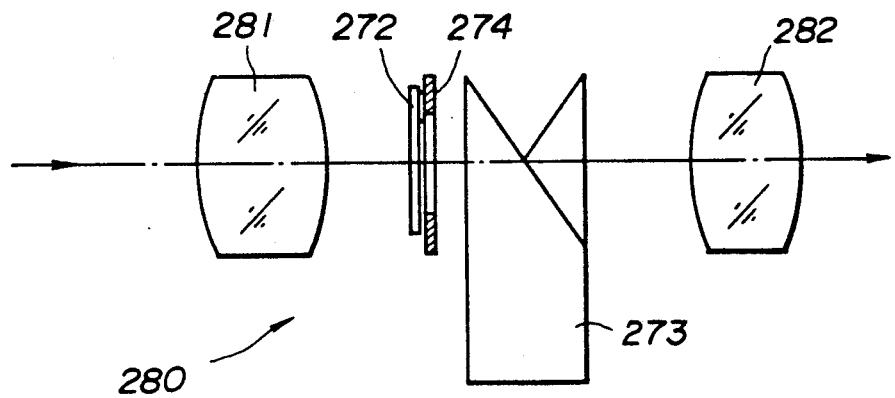
FIG. 72 is an enlarged view showing a main section of a finder optical system in the fourth embodiment of the present invention.

FIG. 72 is an enlarged view of a main section of a finder optical system 280 in the fourth embodiment.

The finder optical system 280 constitutes a real-image type finder similar to that of the third embodiment. An image formation lens 281, a prism 273, and a magnifier 282 are arranged in tandem along the optical axis. In the vicinity of an image formation plane of the image formation lens 281 and on the side of the prism 273, a display mask 274 is placed with its display plane perpendicular to the optical axis. The display mask forms a field frame 270 representing a photographic range shown in FIGS. 73 to 75. On the side of the image formation lens 281 of the display mask 274, a liquid crystal display 272 is placed to cover the field frame (See FIG. 76). The liquid crystal display 272 is, similar to that of the third embodiment, connected to a liquid crystal drive 309 via a member that is not shown (See FIG. 51), and driven by the liquid crystal drive 309.

Figure 73:
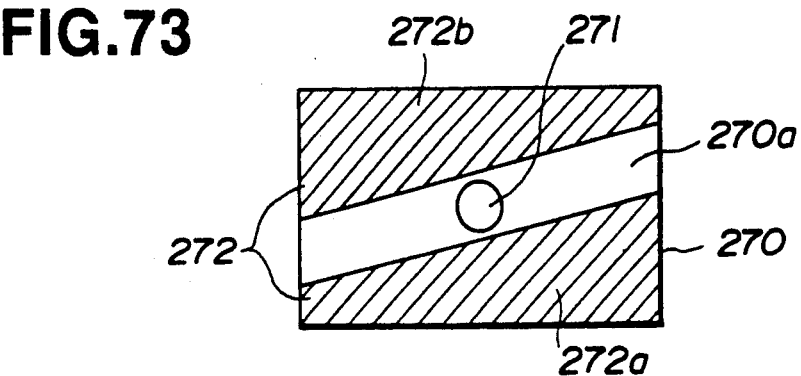
FIG. 73 shows a liquid crystal display and a finder field viewed through an eyepiece shown in FIG. 72.
Figure 74:
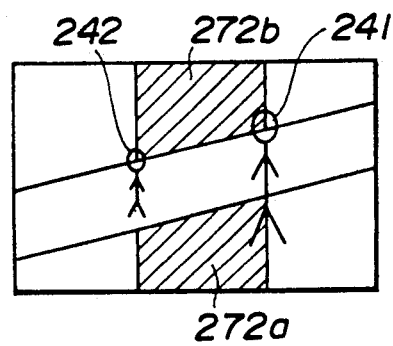
FIG. 74 shows a liquid crystal display and a finder field appearing when the lighting width of the liquid crystal display shown in FIG. 73 agrees with the space between subjects.

FIG. 73 shows a finder field frame 270 viewed through an eyepiece (not shown). The finder field frame 270 is formed with a display mask 274 as mentioned above. Similar to that of the third embodiment, the field frame 270 has a distance measurement circle 271 (a circle in FIG. 73) in its center. A distance measuring unit 302 (See FIG. 51) measures a distance to a subject coming in this circle.

Figure 76:
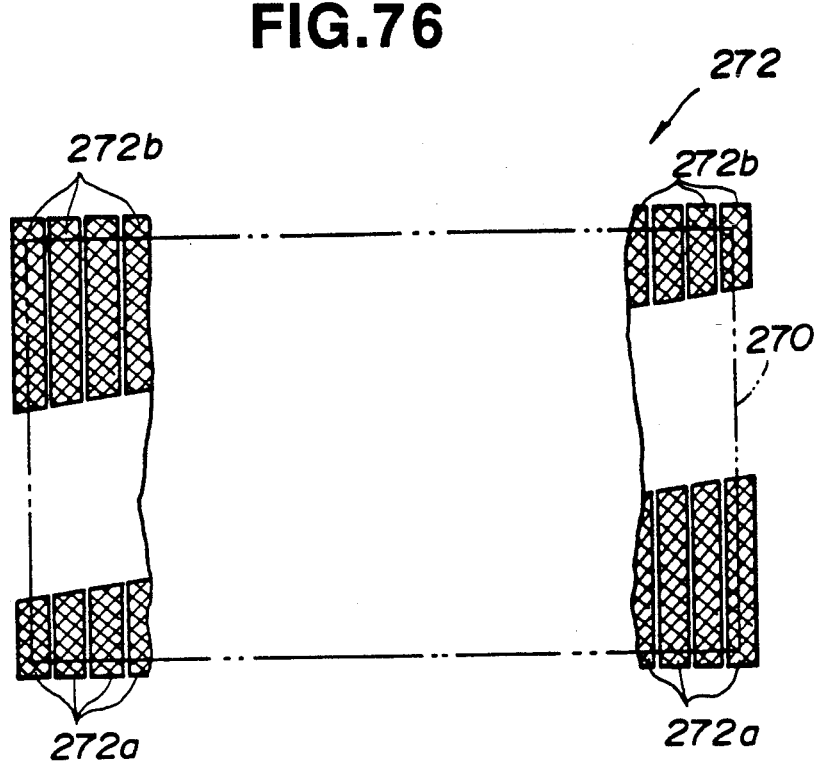
FIG. 76 is an enlarged front view showing the liquid crystal display shown in FIG. 73 in detail.
Figure 77:
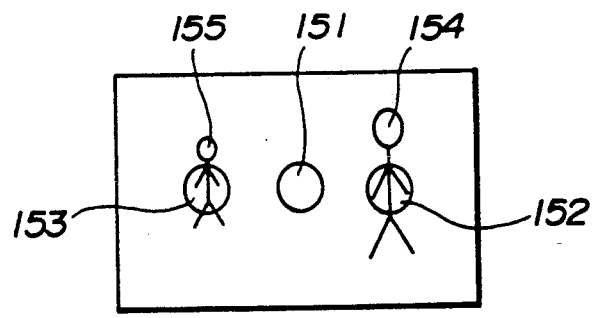
FIG. 77 is a front view showing an example of a finder field frame of a camera having a conventional multipoint distance measuring mechanism.
Figure 78:
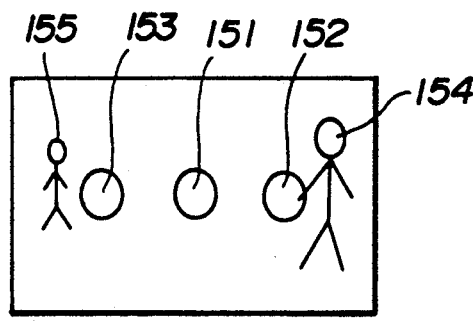
FIG. 78 is a front view showing other example of a finder field frame of a camera having a conventional multipoint distance measuring mechanism.

A liquid crystal display 272 is, as shown in detail in the enlarged front view of FIG. 76, divided into a lower display portion 272a and an upper display portion 272b by a band-like transmission area 270a tilting from the upper right through the center to the lower left of the liquid crystal display. Then, each of the display portions contains multiple segmented liquid crystal fragments as shown in FIG. 76, and any of the display portions is independently driven by a liquid crystal drive 309 (FIG. 51). The liquid crystal display 272 transmits light during normal photography. The transmittance of the liquid crystal display 272 is partly degraded during variable lighting, thus differentiating liquid crystal fragments being driven. The transmittance may be lowered greatly enough to nearly shield light, thus differentiating the liquid crystal fragments being driven.

The band-like transmission area 270a passing through the center of the field frame 270 and rising rightward transmits light all the time. The distance measurement circle 271 is created in the center of the transmission area 270a.

Next, the operations of the camera of the fourth embodiment having the aforesaid configuration will be described.

The camera of the fourth embodiment can be manipulated in the same way as that of the third embodiment. However, when distance measurement is carried out for variable lighting, different displays appear in a finder.

A liquid crystal display 272 shown in FIG. 73 lights entirely. All liquid crystal fragments are energized to suppress light transmission or shield light. Hatched areas indicate liquid crystal fragments being driven. On the liquid crystal display 272 shown in FIG. 74, an operation lever 208 has been turned to an L2 or R2 position and held there, and thus an apparent space between subjects 241 and 242 has been specified. As described previously, hatched areas indicate liquid crystal fragments being driven. On the liquid crystal display shown in FIG. 75, the operation activated when the operation lever 208 is turned to an L1 or R1 position and held there has terminated. Like FIG. 74, a hatched area indicates liquid crystal fragments being driven.

Figure 75:
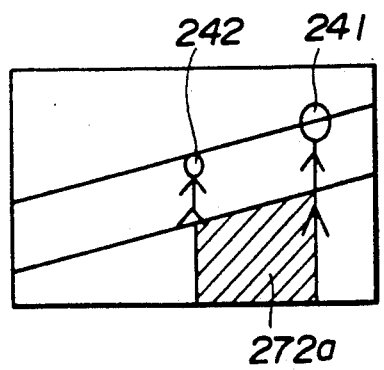
FIG. 75 shows a liquid crystal display and a finder field appearing after the lighting width of the liquid crystal display is adjusted to agree with the interval between subjects, then an operation is completed.

After the state shown in FIG. 75, the camera enters a release standby state. After the release, the camera operates similar to that of the third embodiment.

Using the camera of the fourth embodiment having the aforesaid configuration, since a subject specifying means is installed within a field frame and resides in a photographic field, a photographer need not be conscious of the outside of the photographic field area but can specify a subject effortlessly. Compared with the third embodiment in which the specifying means is installed outside the field frame, the specifying means can be increased in size. This eventually improves precision in specifying a subject.

The third and fourth embodiments relate to a lens-shutter type camera. The specifying means installed in a finder employed in the embodiments is not restricted to a real-image type finder. Alternatively, a liquid crystal display may be placed in the vicinity of a focusing screen of a single-lens reflex camera. This variant has the same advantages as the previous embodiments. In this case, a strobe may be installed in a camera body or mounted on the body. As far as control can be extended to the strobe, no problem occurs.

In the third and fourth embodiments, a single-focus lens having a focal distance f of 35 mm is employed. The photographic lens may have other focal distance or may be a zoom lens. The advantages of the present invention will still be available, the errors described previously may slightly vary though.

According to the third or fourth embodiment, the camera performs distance measurement multiple times prior to exposure in order to measure distances to multiple subjects existent at different distances within a photographic range, and specifies the positional relationships of the distance measurement information in the photographic range. Thereby, quantities of flashlight that enable the subjects to be exposed to optimal quantities of light during strobe lighting are computed, then the quantities of light of two flashtubes are controlled according to the computed outputs. Therefore, photographs that could be available only using a sophisticated lighting technology can be taken quite easily.

A strobe achieves lighting variation merely by controlling non-uniform quantities of light of two strobe lighting flashtubes. Therefore, no driving member is required for lighting variation. This permits a compactly-designed strobe and does not affect a release time lag. Other various advantages are available.

A varying display in a finder field is used as a means for specifying the positional relationships of subjects. A photographer can complete a series of manipulations without being distracted from a finder. Furthermore, the photographer can determine instantaneously whether the specified relationships agree with his/her intended composition. Therefore, the photographer will not miss a photographic timing but can obtain intended results.

In the present invention, it will be apparent that a wide range of different working modes can be formed based on this invention without departing from the spirit and scope of the invention. This invention will be limited to the appended claims but not restricted to any specific embodiment.

What is claimed is:

1. A camera, comprising:
   a distance measuring means for measuring distances to subjects existent in specific areas within a photographic angle of view;

a storing means for storing distance information representing measured distances from said camera to at least two subjects existent at different distances said distance measuring means provides;

a specifying means for specifying positional relationships of at least said two subjects relative to said camera;

a displaying means interlocked with specification of said specifying means and helping a user recognize said positional relationships said specifying means provides;

an arithmetic logic means receiving said distance measurement information and said positional relationships to calculate an inclination of a tiltably mounted photographic optical system necessary for producing an image on an image plane in which said at least two subjects are in focus; and a driving means for tilting said photographic optical system relative to said image plane according to an output of said arithmetic logic unit.

2. A camera according to claim 1 wherein said displaying means is formed in an observation field of a finder.

3. A camera according to claim 1 wherein said positional relationships of at least two subjects are represented as angles relative to an optical axis of said photographic optical system and said display means including means for displaying the positional relationships responsive to said specifying means.

4. The camera of claim 1 wherein said displaying means further comprises:
finder means for observing a field of view to be photographed;
a frame defining the field of view presented in a finder eyepiece;
a display means associated with said frame for generating a bar-like display representing the separation between two objects in the field of view said display means being responsive to manipulation of a movable operating member for controlling the length and position of said bar-like display.

5. The camera of claim 1 wherein said driving means comprises:
a camera body;
a first frame tiltably mounted in said camera body;
a taking lens having an optical axis;
a second frame supporting said taking lens;
means mounted between said first and second frames for limiting movement of said second frame in a direction parallel to said optical axis for focusing said taking lens; and
tilt means for tilting the first frame relative to said optical axis.

6. A camera, comprising:
a distance measuring means for measuring distances to subjects existent in a photographic angle of view;
a storing means for storing distance information said distance measuring means provides;
a specifying means for specifying positional relationships of multiple subjects relative to said camera;
an arithmetic logic means receiving said distance measurement information and said positional relationships to calculate an inclination of a tiltable photographic optical system necessary to produce an image on an image plane in which said multiple subjects are in focus; and a driving means for tilting said photographic optical system relative to said image plane according to an output of said arithmetic logic unit.

7. A camera according to claim 6 wherein said positional relationships of multiple subjects are represented as angles relative to an optical axis of said photographic optical system.

8. A camera according to claim 6 wherein said distance measuring means measures distances to multiple subjects sequentially.

9. A camera according to claim 6 further comprising a displaying means generating a display for helping a user recognize said positional relationships said specifying means provides.

10. A camera according to claim 8 wherein said storing means sequentially stores distance information said distance measuring means outputs sequentially.

11. A photographic procedure for a camera having a tiltable photographic optical system, comprising the steps of:
measuring distances from the camera to two main subjects existent at different distances;
storing distance measurement information resulting from said distance measurement in a storing means;
specifying positional relationships of said two main subjects to said camera;
using distances to said two main subjects and their positional relationships to calculate an inclination of the photographic optical system; and
tilting said photographic optical system according to said calculated inclination.

12. A photographic procedure according to claim 11 wherein said step of specifying positional relationships is executed under observation of a displaying means installed in the camera.

13. A photographic procedure for a camera having a tiltable photographic optical system, comprising the steps of:
measuring distances from the camera to subjects;
storing distance measurement information resulting from said distance measurement in a storing means;
specifying positional relationships of multiple subjects to said camera;
using distances to said multiple subjects and their positional relationships to calculate an inclination of a photographic optical system; and
tilting said photographic optical system according to said calculated inclination.

14. A photographic procedure according to claim 13 wherein said step of specifying positional relationships is executed under observation of a displaying means installed in the camera.

15. A photographic procedure according to claim 13 wherein said step of measuring distances and a step of storing distance measurement information are repeated multiple times.

16. A camera, comprising:
a distance measuring means for measuring distances to subjects existent in specific areas within a photographic angle of view;
a storing means for storing distance information representing measured distances from said camera to at least two subjects at different distances said distance measuring means provides;
a specifying means for specifying positional relationships of said at least two subjects within an angle of view;

a displaying means responsive to and interlocked with specification of said specifying means and generating a display for helping a user recognize said positional relationships said specifying means provides;

an arithmetic logic means receiving said distance measurement information and said positional relationships to calculate quantities of exposure necessary for optimal exposure of said at least two subjects; and a flashing means and means for varying the lighting characteristic of the flashing means according to an output of said arithmetic logic unit.

17. A camera according to claim 16 wherein said displaying means is installed in an observation field of a finder associated with said camera.

18. A camera according to claim 16 wherein said positional relationships of at least two subjects are represented as angles relative to the optical axis of the photographic optical system.

19. A camera according to claim 16 wherein said flashing means has a plurality of flashtubes.

20. A camera according to claim 19 wherein said means for varying said flashing means controls quantities of flashlight of said plurality of flashtubes and thereby radiates disparate flashes to a subject field.

21. A camera, comprising:
a distance measuring means for measuring distances to subjects existent in a photographic angle of view;
a storing means for storing distance information said distance measuring means provides;
a specifying means for specifying positional relationships of a plurality of subjects to said camera;
an arithmetic logic means receiving said distance measurement information and said positional relationships to calculate quantities of exposure necessary for optimal exposure of said plurality of subjects; and
a flashing means including means for varying the lighting characteristic of the flashing means according to an output of said arithmetic logic means.

22. A camera according to claim 21 wherein said positional relationships of a plurality of subjects are represented as angles relative to the optical axis of a photographic optical system.

23. A camera according to claim 21 wherein said distance measuring means measures distances to a plurality of subjects sequentially.

24. A camera according to claim 21 further comprising a displaying means generating a display for helping a user recognize said positional relationships said specifying means provides.

25. A camera according to claim 23 wherein said storing means stores distance information said distance measuring means outputs sequentially.

26. A photographic procedure for a camera having a strobe means, comprising the steps of:
measuring distances from the camera to two main subjects existent at different distances from the camera;
storing distance measurement information resulting from said distance measurement in a storing means;
specifying positional relationships of said two main subjects to said camera;
using said distance measurement information and said positional relationships to calculate quantities of exposure necessary for optimal exposure of said at least two subjects; and
varying the lighting characteristic of the strobe means according to said calculated quantities of exposure.

27. A photographic procedure according to claim 26 wherein said step of specifying positional relationships is executed under observation of a displaying means installed in the camera.

28. A photographic procedure according to claim 26 wherein said step of measuring distances and said step of storing distance measurement information are sequentially repeated multiple times.

29. A photographic procedure for a camera having a strobe means, comprising the steps of:
measuring distances from the camera to subjects;
storing distance measurement information resulting from said distance measurement in a storing means;
specifying positional relationships of a plurality of subjects to said camera;
using said distance measurement information and said positional relationships to calculate quantities of exposure necessary for optimal exposure of said plurality of subjects; and
varying the lighting characteristic of said strobe means according to said calculated quantities of exposure.

30. A photographic procedure according to claim 29 wherein said step of specifying positional relationships is executed under observation of a displaying means installed in the camera.

31. An automatic focusing camera having a tiltable photographic optical system, comprising:
a tilt lens driving means for tilting said photographic optical system so that an optical axis of said optical system is nonparallel with a line normal to a film surface;
a distance measuring means for measuring distances to a plurality of subjects;
a tilt computing means for controlling said tilt lens driving means according to an output of said distance measuring means; and
a flashing means for distributing light to individual subjects for optimal exposure.

32. An automatic focusing camera having a photographic optical system according to claim 31 wherein said flashing means has at least two independent flashtubes.

33. An automatic focusing camera having a tiltable photographic optical system, comprising:
a tilt lens driving means for tilting said photographic optical system so as to be nonparallel with a normal line of a film surface of said photographic optical system;
a distance measuring means for measuring distances to a plurality of subjects;
a tilt computing means for controlling said tilt lens driving means according to an output of said distance measuring means;
a focusing means for driving at least part of said photographic optical system according to an output of said tilt computing means; and
a flashing means for distributing disparate light or light of dissimilar quantities to a subject field.

34. An automatic focusing camera having a tiltable photographic optical system, comprising:
a tilt lens driving means for tilting said photographic optical system so that an optical axis of the optical system is nonparallel with a line normal to a film surface;

a distance measuring means for measuring distances to multiple subjects and storing the individual measured values;

a tilt computing means for controlling said tilt lens driving means according to an output of said distance measuring means;

a focusing means for driving at least part of said photographic optical system according to an output of said tilt computing means; and a flashing means for distributing light to individual subjects for optimal exposure.

35. A camera, comprising:

a distance measuring means for measuring distances to subjects existent in specific areas within a photographic angle of view;

a storing means for storing distance information representing measured distances from said camera to a plurality of subjects at different distances said distance measuring means provides;

a specifying means for specifying positional relationships of said plurality of subjects to said camera;

a displaying means responsive to and interlocked with specification of said specifying means and generating a display for helping a user recognize said positional relationships said specifying means provides;

a first arithmetic logic unit receiving said distance measurement information and said positional relationships to calculate an inclination of a tiltable photographic optical system for producing an image in which said plurality of subjects are in focus;

a driving means for tilting said photographic optical system according to an output of said first arithmetic logic means;

a second arithmetic logic means for computing said distance measurement information and said positional relationships to calculate quantities of exposure necessary for optimal exposure of said plurality of subjects; and a flashing means including means for varying the lighting characteristic of the flashing means responsive to an output of said second arithmetic logic means.

36. A camera according to claim 35 wherein said flashing means includes a plurality of flashtubes arranged in parallel on a plane along which the photographic optical system is tilted.

37. A camera according to claim 36 wherein said means for varying said flashing means controls quantities of flashlight of a plurality of flashtubes and thus controls flashes to be radiated to a plurality of subjects.

38. A camera according to claim 37 wherein said flashing means controls flashes to be radiated to a plurality of subjects uniformly.

39. A camera comprising:

a distance measuring means for measuring distances to subjects existent in specific areas within a photographic angle of view;

a storing means for storing distance information representing measured distances from said camera to a plurality of subjects existent at different distances said distance measuring means provides; and a specifying means for specifying positional relationships of said plurality of subjects to said camera and further representing distances between the subjects and the camera.

40. A camera according to claim 39 further comprising a display means responsive to said specifying means for displaying the positional relationships and distances of said subjects from said camera.

41. A camera according to claim 40 wherein said display means displays provides its display in a camera finder.

42. A camera comprising:

a distance measuring means for measuring distances to subjects existent in specific areas within a photographic angle of view;

a storing means for storing distance information representing measured distances from said camera to a plurality of subjects existent at different distances said distance measuring means provides;

a specifying means for specifying positional relationships of said plurality of subjects to said camera; and an arithmetic logic means for computing said distance measurement information and said positional relationships to calculate an inclination of a tiltable photographic optical system necessary for producing an image in which said plurality of subjects are in focus.

43. A camera according to claim 42 further comprising a driving means for tilting said photographic optical system according to an output of said arithmetic logic means.

44. A camera comprising:

a distance measuring means for measuring distances to subjects existent in specific areas within a photographic angle of view;

a storing means for storing distance information representing measured distances from said camera to a plurality of subjects existent at different distances said distance measuring means provides;

a specifying means for specifying positional relationships of said plurality of subjects to said camera; and an arithmetic logic means for computing said distance measurement information and said positional relationship to calculate quantities of exposure necessary for optimal exposure of said plurality of subjects.

45. A camera according to claim 44 further comprising a flashing means for varying the lighting characteristic according to an output of said arithmetic logic means.

46. A display for use in a camera useful in determining the spacing between two objects in a field of view comprising:

finder means for observing a field of view to be photographed;

a frame defining the field of view presented in a finder eyepiece;

a display means associated with said frame for generating a bar-like display representing the separation between two objects in the field of view said display means being responsive to manipulation of a movable operating member for controlling the length and position of said bar-like display.

47. The display of claim 46 wherein said operating member is movable to first and second positions, said display means including means for lengthening said bar when said member is in said first position and shortening said bar when said member is in said second position.

48. The display of claim 46 wherein said display means includes means responsive to manipulation of said operating member for generating a tapered bar-like display which tapers from a greater thickness at one end of the bar-like display to a smaller thickness at an opposite end of said bar-like display.

49. The display of claim 48 wherein the end of the bar-like display of greater thickness is positioned adjacent to the subject closer to the camera and the end of the bar-like display of smaller thickness is adjacent to the object further from said camera.

50. The display of claim 49 wherein said operating member is movable to third and fourth positions, said end of greater thickness being at the left of an eyepiece window when said operating member is in said third position and is at the right of the eyepiece window when the operating member is in said fourth position.

51. The display of claim 48 wherein said display means is a liquid crystal display means.

52. The display of claim 51 wherein said liquid crystal display means comprises an array of liquid crystal elements collectively defining a rectangular-shaped perimeter;

first and second groups of said elements each collectively defining a triangular-shaped array, said triangular-shaped arrays being arranged so that the triangular-shaped arrays define said rectangular-shaped perimeter.

53. The display of claim 52 wherein the elements in each group have a common width and differing lengths.

54. The display of claim 53 wherein some of the elements in each group have a triangular shape and the remaining elements in each group have a trapezoidal shape.

55. The display of claim 53 wherein substantially all of the elements in each group have a trapezoidal shape.

56. The display of claim 46 wherein said display means is adjacent to a side of the image field defined by said frame.

57. The display of claim 46 wherein said display means is superimposed upon the field of view presented in the finder eyepiece.

58. The display of claim 57 wherein said liquid crystal display means comprises an array of liquid crystal elements collectively defining a rectangular-shaped perimeter;

first and second groups of said elements each collectively defining a triangular-shaped array, said triangular-shaped arrays being arranged so that the triangular-shaped arrays define said rectangular-shaped perimeter.

59. The display of claim 58 wherein each triangular-shaped array has a diagonally aligned side;

the diagonally aligned sides of said triangular-shaped arrays being spaced from one another to form a diagonally aligned viewing region viewable through the finder eyepiece.

60. The display of claim 59 wherein the diagonally aligned viewing region is provided with a circular-shaped marking viewable from said eyepiece which aids in aiming the camera.

61. A tilting device for a camera optical system comprising:
a camera body;
a first frame tiltably mounted in said camera body;
a taking lens having an optical axis;
a second frame supporting said taking lens;
means coupled between said first and second frames for limiting movement of said second frame to movement parallel to said optical axis to enable focusing of said taking lens; and
tilt means for tilting the first frame relative to said optical axis.

62. The tilting device of claim 61 wherein said tilt means comprises:
a ring positioned adjacent to said first frame and having a ramp-shaped projection extending from one surface thereof;
means for rotating said ring;
a projection on said first frame for engaging said ramp, whereby a tilt angle of said first frame is related to the amount of rotation of said ring.

63. The tilting device of claim 62 further including bias means for normally biasing said projection toward engagement with said ring.

64. The tilting device of claim 61 further comprising pivot means for tiltably mounting said first frame within said camera body.

65. The tilting device of claim 62 further comprising:
sensing means for sensing the rotation of said ring to control the rotation of said ring.

66. The tilting device of claim 65 wherein said means for rotating comprises a motor;
means for generating pulses representing rotation of said motor;
said ring having a notched periphery and a slot displaced from said notched periphery;
said sensing means initiating counting of said pulses responsive to sequential sensing of said notched periphery and said slot.

67. The tilting device of claim 61 wherein said tilt means comprises:
a ring having a pair of ramp-shaped projections extending from one surface thereof;
means for rotating said ring;
a projection on said first frame for selectively engaging one of said ramps, whereby a tilt angle of the first frame is related to the amount of rotation of said ring and a direction of tilt of the first frame is determined by the ramp engaging the projection.

68. A method for operating a camera having a tiltable photographic optical system with a predetermined optical axis, comprising the steps of:
(a) determining a distance of a first object in an image field;
(b) storing the distance information obtained in step (a);
(c) determining a distance of a second object in the image field;
(d) storing the distance information obtained in step (c);
(e) determining a spacing between said first and second objects; and
(f) calculating the tilt angel to be imparted to the optical system from the information stored in steps (b) and (d) and the information obtained in step (e) to bring the first and second objects into focus; and
(g) tilting the optical system relative to a film plane according to the calculated amount.

69. A method for operating a camera having a flash means, comprising the steps of:
(a) determining a distance of a first object in an image field;

(b) storing the distance information obtained in step (a);
(c) determining a distance of a second object in the image field;
(d) storing the distance information obtained in step (c);
(e) determining a spacing between said first and second objects; and
(f) calculating the amount of light each subject is to receive to provide a proper exposure; and
(g) controlling the pattern of light produced by said flash means according to the calculated value.

70. The method of claim 69 wherein said flash means comprises first and second flash means for generating first and second different light distribution patterns and including the step of controlling the relative amount of light generated by each flash means to obtain the desired light distribution pattern.

71. An automatic focusing camera comprising:
a photographic optical system having an optical axis;
tilting means for tilting said photographic optical systems so that an angle formed between said optical axis and an image plane is changed;
distance measuring means for measuring distances to a plurality of objects within an optical field of view; and
tilt computing means for controlling said tilting means according to an output of said distance measuring means.

* * * * *

UNITED STATES PATENT AND TRADEMARK OFFICE
CERTIFICATE OF CORRECTION

Page 1 of 2

PATENT NO. : 5,305,045
DATED : April 19, 1994
INVENTOR(S) : Hiroshi Terada

It is certified that error appears in the above-indentified patent and that said Letters Patent is hereby corrected as shown below:

Column 6, lines 10 and 11, change "Fig. 43 shows a looking in the direction of arrows B-B cross section of a strobe in Fig. 41;" to --Fig. 43 shows a cross section of a strobe looking in the direction of arrows B-B in Fig. 41;--.

Column 7, line 9, after "S215" insert --in--.

Column 10, line 3, delete "(indicated with a circle in Fig. 11)".

Column 16, line 4, after "tilting" insert --of--.

Column 18, line 56, after "area" insert --indicates--.

Column 21, lines 13 and 14, change "general by" to --generally--.

Column 25, line 19, after "position" insert --are--.

UNITED STATES PATENT AND TRADEMARK OFFICE
CERTIFICATE OF CORRECTION

PATENT NO. : 5,305,045
DATED : April 19, 1994
INVENTOR(S) : Hiroshi Terada

It is certified that error appears in the above-indentified patent and that said Letters Patent is hereby corrected as shown below:

Column 36,

Claim 44, lines 13 and 14, change "relationship" to --relationships--.

Column 37,

Claim 51, line 1, change "48" to --46--.

Signed and Sealed this

Twenty-eight Day of February, 1995

Attest:

BRUCE LEHMAN

Attesting Officer

Commissioner of Patents and Trademarks